US011307355B2

(12) United States Patent
Oka

(10) Patent No.: US 11,307,355 B2
(45) Date of Patent: Apr. 19, 2022

(54) 90-DEGREE OPTICAL HYBRID

(71) Applicant: Fujitsu Optical Components Limited, Kawasaki (JP)

(72) Inventor: Akira Oka, Kawasaki (JP)

(73) Assignee: FUJITSU OPTICAL COMPONENTS LIMITED, Kawasaki (JP)

(\*) Notice: Subject to any disclaimer, the term of this patent is extended or adjusted under 35 U.S.C. 154(b) by 0 days.

(21) Appl. No.: 17/178,743

(22) Filed: Feb. 18, 2021

(65) Prior Publication Data

US 2021/0294038 A1 Sep. 23, 2021

(30) Foreign Application Priority Data

Mar. 19, 2020 (JP) .............................. JP2020-049117

(51) Int. Cl.
*G02B 6/26* (2006.01)
*G02B 6/293* (2006.01)

(52) U.S. Cl.
CPC ............... *G02B 6/29344* (2013.01)

(58) Field of Classification Search
CPC ...... G02B 6/29344; G02B 2006/12061; G02B 2006/1215; G02B 2006/12176; G02B 2006/12195; G02B 6/125; G02B 6/2813
See application file for complete search history.

(56) References Cited

U.S. PATENT DOCUMENTS

| 9,746,609 | B2* | 8/2017 | Ma | G02B 6/1228 |
| 10,126,498 | B1 | 11/2018 | Ma et al. | |
| 10,677,987 | B1* | 6/2020 | Dumais | G02F 1/011 |
| 2011/0229069 | A1 | 9/2011 | Bontempi et al. | |
| 2015/0378098 | A1* | 12/2015 | Matsumoto | G02B 6/2938 356/477 |
| 2017/0227711 | A1* | 8/2017 | Tu | G02B 6/12 |

(Continued)

FOREIGN PATENT DOCUMENTS

JP 2011-18002 A 1/2011

OTHER PUBLICATIONS

Guan et al., "Compact and low loss 90° optical hybrid on a silicon-on-insulator platform", Optics Express, vol. 25, No. 23, Nov. 13, 2017, pp. 28957-28968.

(Continued)

*Primary Examiner* — Ellen E Kim
(74) *Attorney, Agent, or Firm* — Staas & Halsey LLP

(57) ABSTRACT

A 90-degree optical hybrid includes two optical splitters that respectively split inputted light into two beams, two optical combiners that respectively combine two beams of inputted light and thereby output two beams of interfering light respectively, and four arm waveguides that input light splitted by any of the two optical splitters into any of the two optical combiners. Each of the four arm waveguides has a bend waveguide arranged at its center and a plurality of optical waveguides including a tapered waveguide having a width that decreases toward the bend waveguide. Both ends of each of the plurality of optical waveguides are respectively in contact with a end surface of any one of the two optical splitter, the two optical combiners, the bend waveguide and the other of the plurality of optical waveguides, and each of the plurality of waveguides is the tapered waveguide or a linear waveguide.

9 Claims, 22 Drawing Sheets

(56) References Cited

U.S. PATENT DOCUMENTS

2019/0049665 A1    2/2019  Ma et al.

OTHER PUBLICATIONS

Sheng et al., "A Compact and Low-Loss MMI Coupler Fabricated With CMOS Technology," IEEE Photonics Journal, vol. 4, No. 6, Dec. 2012, pp. 2272-2277.
Masaki Kohtoku, "Waveguide Manufacturing Technology Supporting Next Generation PLC", NTT Technical Review, May 2005, pp. 28-31.

* cited by examiner

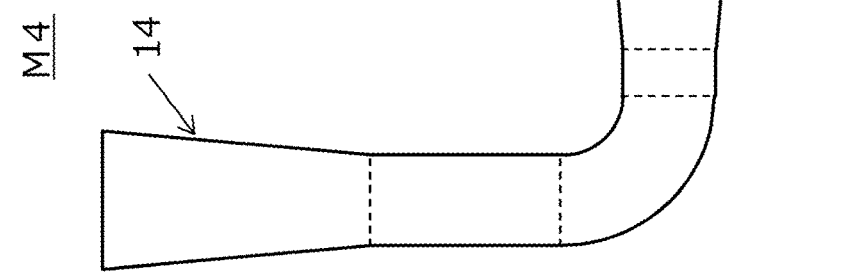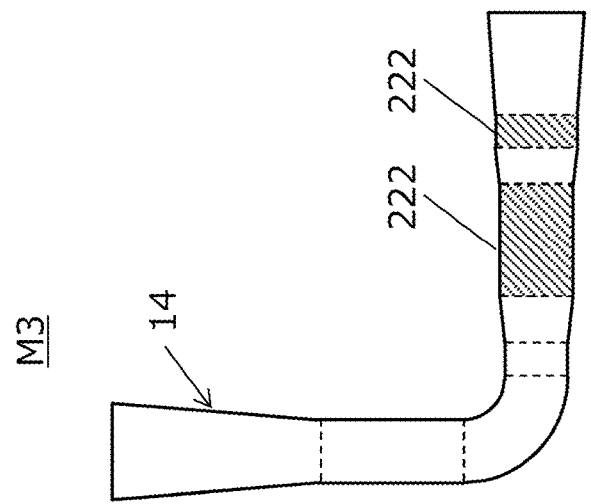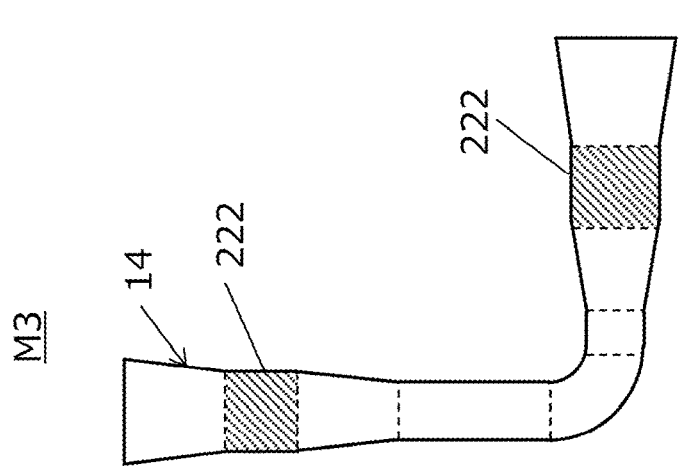

90-DEGREE OPTICAL HYBRID

CROSS-REFERENCE TO RELATED APPLICATION

This application is based upon and claims the benefit of priority of the prior Japanese Patent Application No. 2020-049117, filed on Mar. 19, 2020, the entire contents of which are incorporated herein by reference.

FIELD

The embodiments discussed herein are related to a 90-degree optical hybrid.

BACKGROUND

A 90-degree optical hybrid is an optical apparatus which generates four beams of interfering light, having phases that differ from each other by 90°, from signal light and reference light (e.g., refer to U.S. Patent Specification No. 10126498 and Japanese Patent Application Laid-open No. 2011-18002). The 90-degree optical hybrid is, for instance, used in a receiver for digital coherent optical communication or the like. Beams of interfering light outputted from the 90-degree optical hybrid are converted by balanced photo-detectors into two electrical signals having different phases. Two mutually orthogonal electrical signals are demodulated from the electrical signals.

The 90-degree optical hybrid splits signal light and reference light respectively into two beams and gives to each beam of the splitted reference light a mutually different phase. Each beam of the splitted reference light, which is given a mutually different phase, and either of the beams of the splitted signal light are mixed, thereby generating four beams of interfering light having phases that differ from each other by 90°. Alternatively, mutually different phases may be given to the beams of the splitted signal light, instead of the beams of the splitted reference light, and the beams of the splitted signal light having been given mutually different phases may be mixed with the beams of the splitted reference light.

Two structures for giving mutually different phases to the beams of splitted reference light have been proposed. In a first structure, at the time that reference light is splitted, one of the beams of the splitted reference light is simultaneously given a phase that is 90° greater than a phase given to the other beam of the splitted reference light. The splitting is realized by a 2×2 multi-mode interferometer (MMI) or a directional coupler (e.g., refer to U.S. Patent Specification No. 10126498).

In a second structure, an arm waveguide that transmits to an optical combiner one of beams of splitted reference light, which is splitted by an optical splitter, is provided with a phase-shift waveguide having a wider width than other portions (e.g., refer to Japanese Patent Application Laid-open No. 2011-18002). The phase-shift waveguide gives one of the beams of the splitted reference light a phase that is 90° greater than a phase given to the other beam of the splitted reference light. Tapered waveguides are provided at both ends of the phase-shift waveguide to suppress a scattering loss due to discontinuous variations in waveguide width.

According to the first structure, since a phase-shift waveguide is able to be omitted, a 90-degree optical hybrid is able to be downsized. However, in the first structure, since an optical path length inside the optical splitter is dependent on wavelength, a phase difference given to electric fields of the beams of the splitted reference light is also dependent on wavelength. Therefore, a phase difference given to electric fields of the beams of the splitted reference light becomes 90 degrees only at specific wavelengths (e.g., refer to Hang Guan, et al., "Compact and low loss 90° optical hybrid on a silicon-on-insulator platform", Optics EXPRESS, vol. 25, No. 23, 2017). Consequently, the 90-degree optical hybrid having the first structure is not practical. On the other hand, according to the second structure, a phase given to electric fields of the beams of the splitted reference light is not dependent on wavelength (e.g., refer to Japanese Patent Application Laid-open No. 2011-18002).

SUMMARY

According to an aspect of the embodiments, a 90-degree optical hybrid includes two optical splitters configured to respectively split inputted light into two beams, two optical combiners configured to respectively combine two beams of inputted light and thereby output two beams of interfering light respectively, and four arm waveguides that are optical waveguides separated from each other, each of the four arm waveguides being configured to input light splitted by any of the two optical splitters into any of the two optical combiners, wherein each of the four arm waveguides has a bend waveguide arranged at center thereof and a plurality of optical waveguides including a tapered waveguide having a width that decreases toward the bend waveguide, both ends of each of the plurality of optical waveguides are respectively in contact with a first end surface of any one of the two optical splitter, the two optical combiners, the bend waveguide and the plurality of optical waveguides, and each of the plurality of optical waveguides is the tapered waveguide or a linear waveguide having a constant width.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 17 and 18 are a plan view illustrating a 90-degree optical hybrid according to a third modification;

FIG. 19 is a plan view illustrating a 90-degree optical hybrid according to a fourth modification;

DESCRIPTION OF EMBODIMENTS

As described previously, the 90-degree optical hybrid having the first structure, which has a 2×2 MMI, is not practical because of considerable wavelength dependence of a phase difference between the beams of the splitted reference light. On the other hand, according to the second structure which has the phase-shift waveguide, a phase difference between the beams of the splitted reference light is not dependent on wavelength.

However, the 90-degree optical hybrid having the second structure has a problem of an increase in loss by the tapered waveguides that are provided at both ends of the phase-shift waveguide.

Preferred embodiments will be explained with reference to accompanying drawings. Here, identical symbols are given to corresponding parts even in different drawings, and the description thereof will be omitted.

First Embodiment (1) 90-Degree Optical Hybrid

Figure 1:
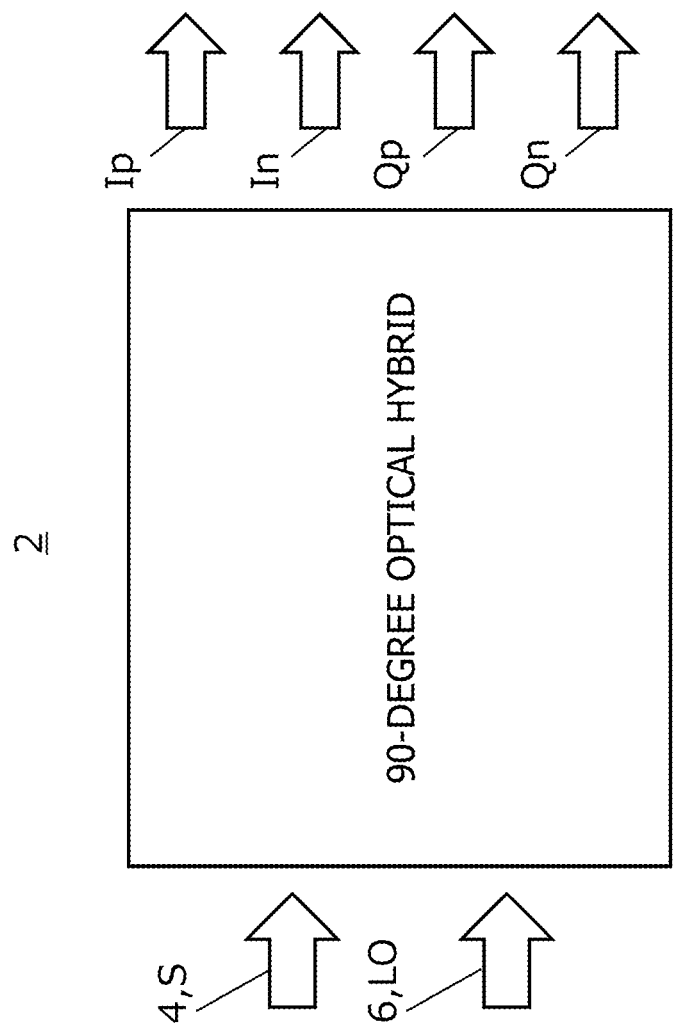
FIG. 1 is a diagram for illustrating features of a 90-degree optical hybrid 2.

FIG. 1 is a diagram for illustrating features of a 90-degree optical hybrid 2. The 90-degree optical hybrid 2 is an apparatus configured to output, when two beams of light 4 and 6 with a same wavelength are inputted thereto, four beams of interfering light Ip, In, Qp, and Qn with phases that differ from each other by 90° by mixing the two beams of light 4 and 6. A phase difference between the interfering light Ip and the interfering light In is 180°. A phase difference between the interfering light Qp and the interfering light Qn is 180°. A phase difference between the interfering light Ip and the interfering light Qp is 90°. A phase difference between the interfering light In and the interfering light Qn is 90°. A phase difference of interfering light refers to a phase difference of light intensity (in other words, power) of interfering light. The 90-degree optical hybrid according to the first embodiment also shares these characteristics.

(2) Structure

Figure 2:
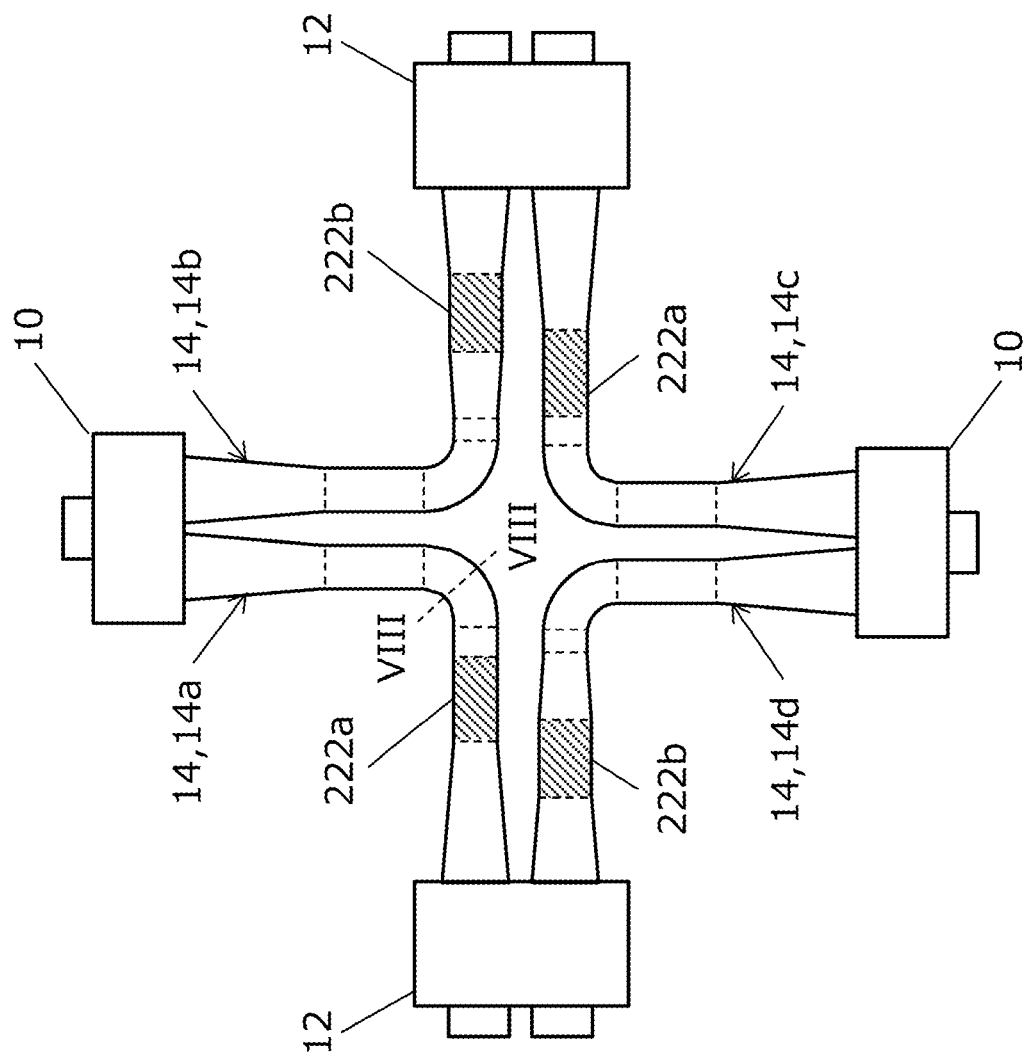
FIG. 2 is a plan view illustrating an example of a 90-degree optical hybrid 8 according to the first embodiment.

FIG. 2 is a plan view illustrating an example of a 90-degree optical hybrid 8 according to the first embodiment.

The 90-degree optical hybrid 8 according to the first embodiment has two optical splitters 10 that respectively split inputted light into two beams, two optical combiners 12 that respectively combine two beams of inputted light and thereby output two beams of interfering light respectively, and four arm waveguides 14.

Figure 3:
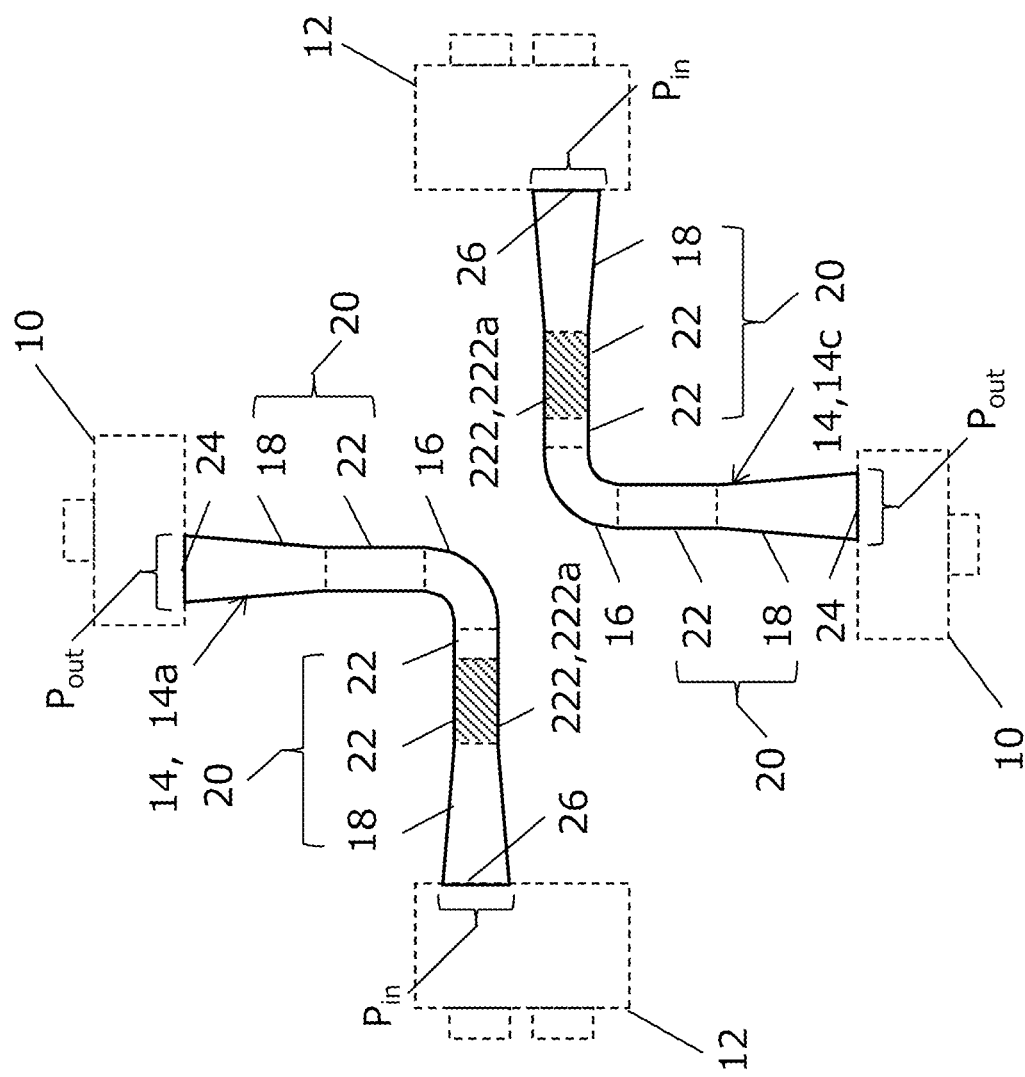
FIGS. 3 and 4 are diagrams illustrating an example of each of the four arm waveguides 14.
Figure 4:
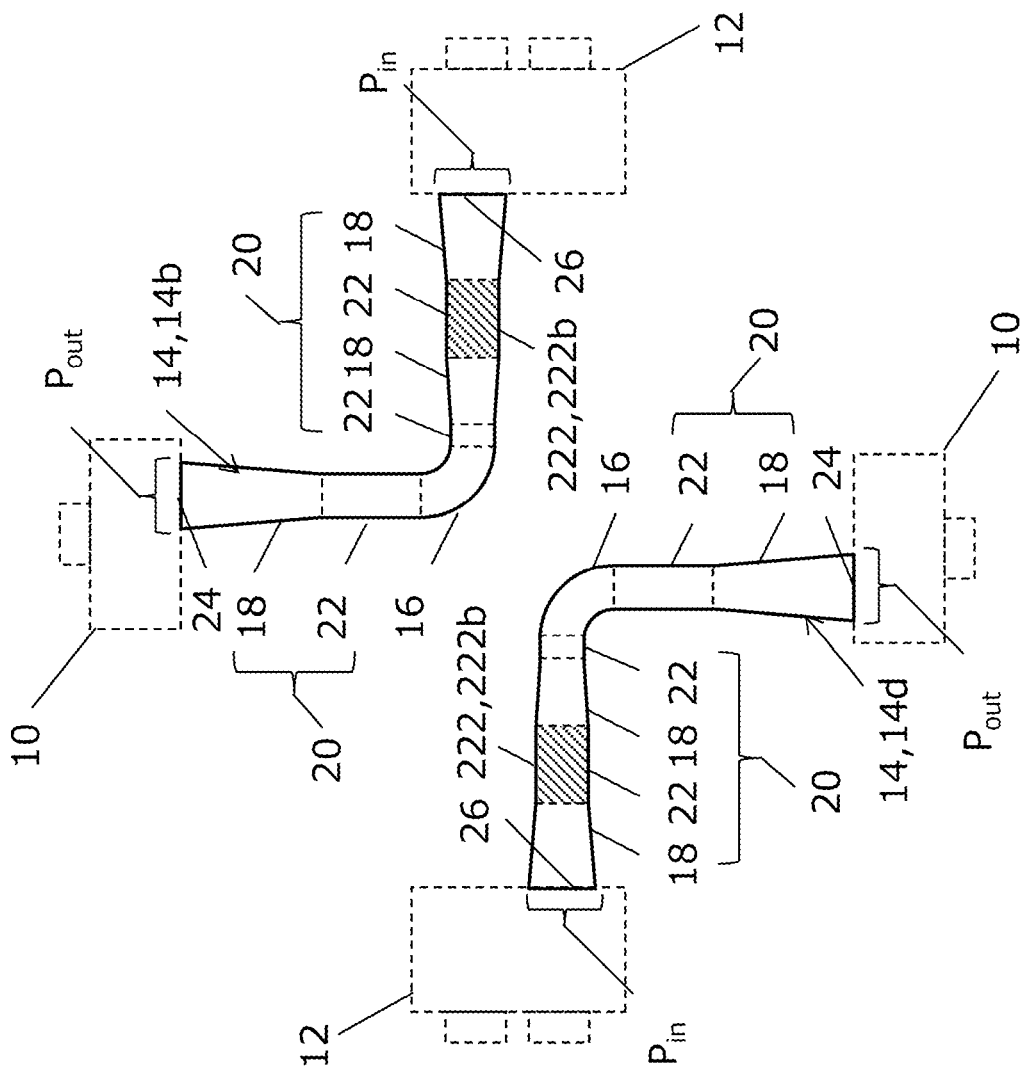

FIGS. 3 and 4 are diagrams illustrating an example of each of the four arm waveguides 14. FIG. 3 illustrates the arm waveguide 14 arranged in the upper left of FIG. 2 and the arm waveguide 14 arranged in the lower right of FIG. 2. FIG. 4 illustrates the arm waveguide 14 arranged in the lower left of FIG. 2 and the arm waveguide 14 arranged in the upper right of FIG. 2. FIGS. 3 and 4 also depict the two optical splitters 10 and the two optical combiners 12 in dashed lines. FIGS. 2 to 4 also illustrate structures of 90-degree optical hybrids 208, 308, and 408 according to second to fourth embodiments to be described later.

The two arm waveguides 14 illustrated in FIG. 3 share a same structure. The two arm waveguides 14 illustrated in FIG. 3 may have different structures as will be described in modifications of the second embodiment. The same applies to the two arm waveguides 14 illustrated in FIG. 4.

The four arm waveguides 14 are, respectively, a plurality of optical waveguides which are separated from each other, and each of the four arm waveguides inputs light splitted by any of the two optical splitters 10 into any of the two optical combiners 12.

Each arm waveguide 14 has a centrally-arranged bend waveguide 16 and a plurality of optical waveguides 20 (refer to FIGS. 3 and 4). The plurality of optical waveguides 20 each includes a tapered waveguide 18 with a width that gradually decreases toward the bend waveguide 16. Each optical waveguide 20 is the tapered waveguide 18 or a linear waveguide 22 with a constant width. The plurality of optical waveguides 20 may not have the linear waveguide 22. A width of an optical waveguide refers to a distance between side surfaces of a core as measured in a direction perpendicular to a propagating direction of light propagated along the optical waveguide in a plan view. A length of an optical waveguide refers to a length of a core of the optical waveguide.

The arm waveguides 14 illustrated in FIG. 3 each has five optical waveguides 20. The arm waveguides 14 illustrated in FIG. 4 each has six optical waveguides 20.

Both ends of each optical waveguide 20 are respectively in contact with an end surface of any one of the optical splitter 10, the optical combiner 12, the bend waveguide 16, and another optical waveguide 20.

Figure 5:
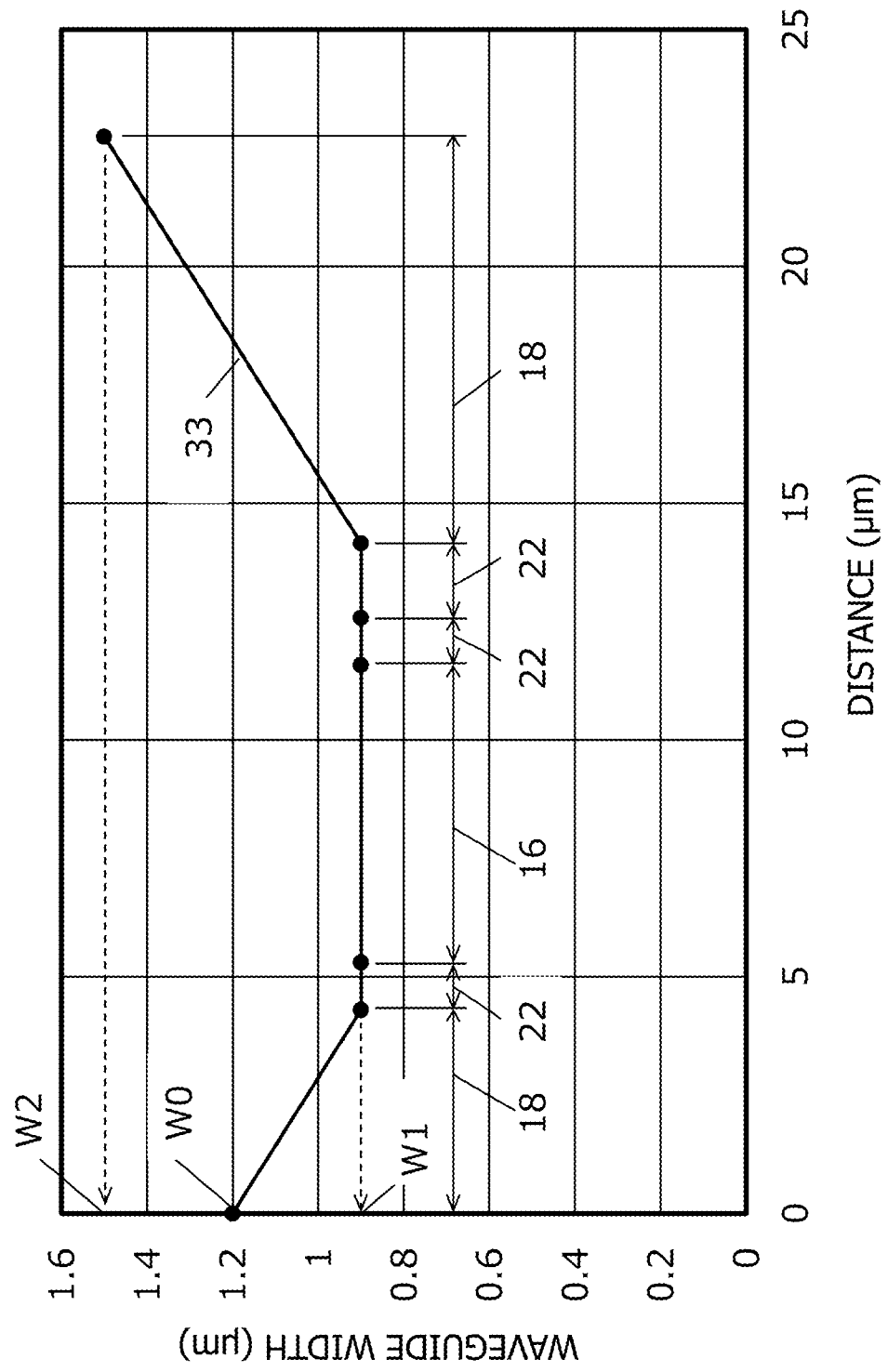
FIG. 5 is a diagram illustrating an example of a change in width of the arm waveguides 14 illustrated in FIG. 3.
Figure 6:
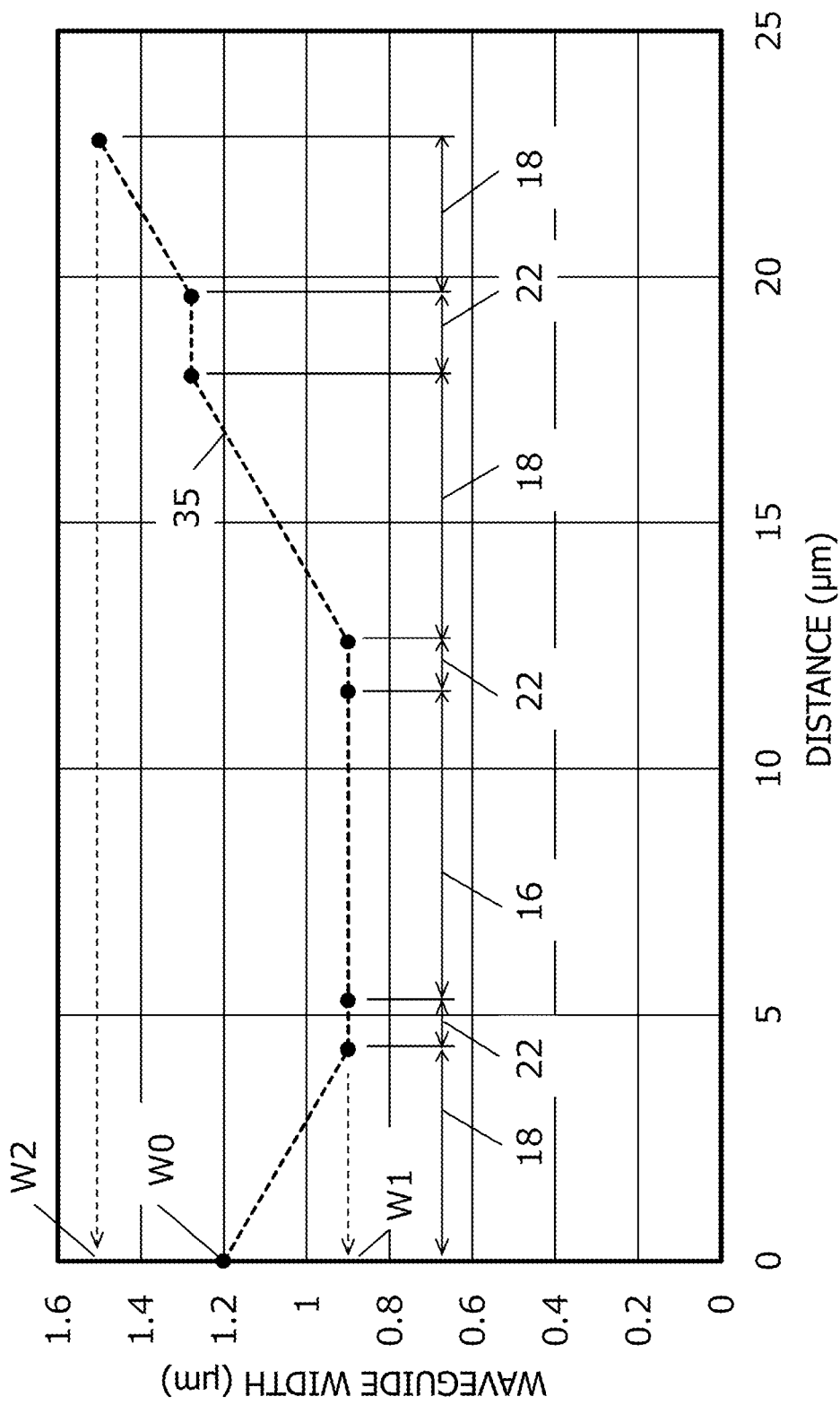
FIG. 6 is a diagram illustrating an example of a change in width of the arm waveguides 14 illustrated in FIG. 4.

FIG. 5 is a diagram illustrating an example of a change in width of the arm waveguides 14 illustrated in FIG. 3. FIG. 6 is a diagram illustrating an example of a change in width of the arm waveguides 14 illustrated in FIG. 4. An ordinate represents the width of the arm waveguides 14. An abscissa represents a distance z from the optical splitter 10 along the arm waveguides 14. Reference signs attached to double-headed arrows (← →) in FIGS. 5 and 6 indicate a type of a waveguide that is arranged in a region represented by the double-headed arrow. For instance, a reference sign "18" attached to a leftmost double-headed arrow in FIG. 5 indicates the tapered waveguide 18. A taper angle of the tapered waveguide illustrated in FIGS. 5 and 6 is 2°. A taper angle refers to an angle between a propagating direction of light propagated along the tapered waveguide 18 and a side surface of the tapered waveguide 18.

Each of the plurality of optical waveguides 20 is the tapered waveguide 18 with a width that gradually decreases toward the bend waveguide 16 or the linear waveguide 22 with a constant width. Therefore, a width W (z) of the arm waveguide 14 relative to a distance z (≥0) from the optical splitter 10 changes from a width W0 (refer to FIGS. 5 and 6) of an end surface 24 on a side of the optical splitter 10 to a width W1 of the bend waveguide 16 while decreasing or kept constant as the distance z increases.

As the distance z further increases, the width W (z) of the arm waveguides 14 changes from the width W1 of the bend waveguide 16 to a width W2 of an end surface 26 (refer to FIGS. 3 and 4) on a side of the optical combiner 12 while increasing or kept constant.

The end surface 24 on the side of the optical splitter 10 is connected to an output port $P_{out}$ of the optical splitter 10, the end surface 24 being one of end surfaces of each arm waveguide 14. A width of the output port $P_{out}$ of the optical splitter 10 is the same as the width of the end surface 24, which is an end surface of the arm waveguide 14, on the side of the optical splitter 10. Therefore, the width of the output port $P_{out}$ of the optical splitter 10 is wider than the width W1 of the bend waveguide 16.

The end surface 26 on the side of the optical combiner 12 is connected to an input port $P_{in}$ of the optical combiner 12, the end surface 26 being another of end surfaces of each arm waveguide 14. A width of the input port $P_{in}$ of the optical combiner 12 is the same as the width of the end surface 26, which is an end surface of the arm waveguide 14, on the side of the optical combiner 12. Therefore, the width of the input port $P_{in}$ of the optical combiner 12 is wider than the width W1 of the bend waveguide 16.

(3) Operation

Figure 7:
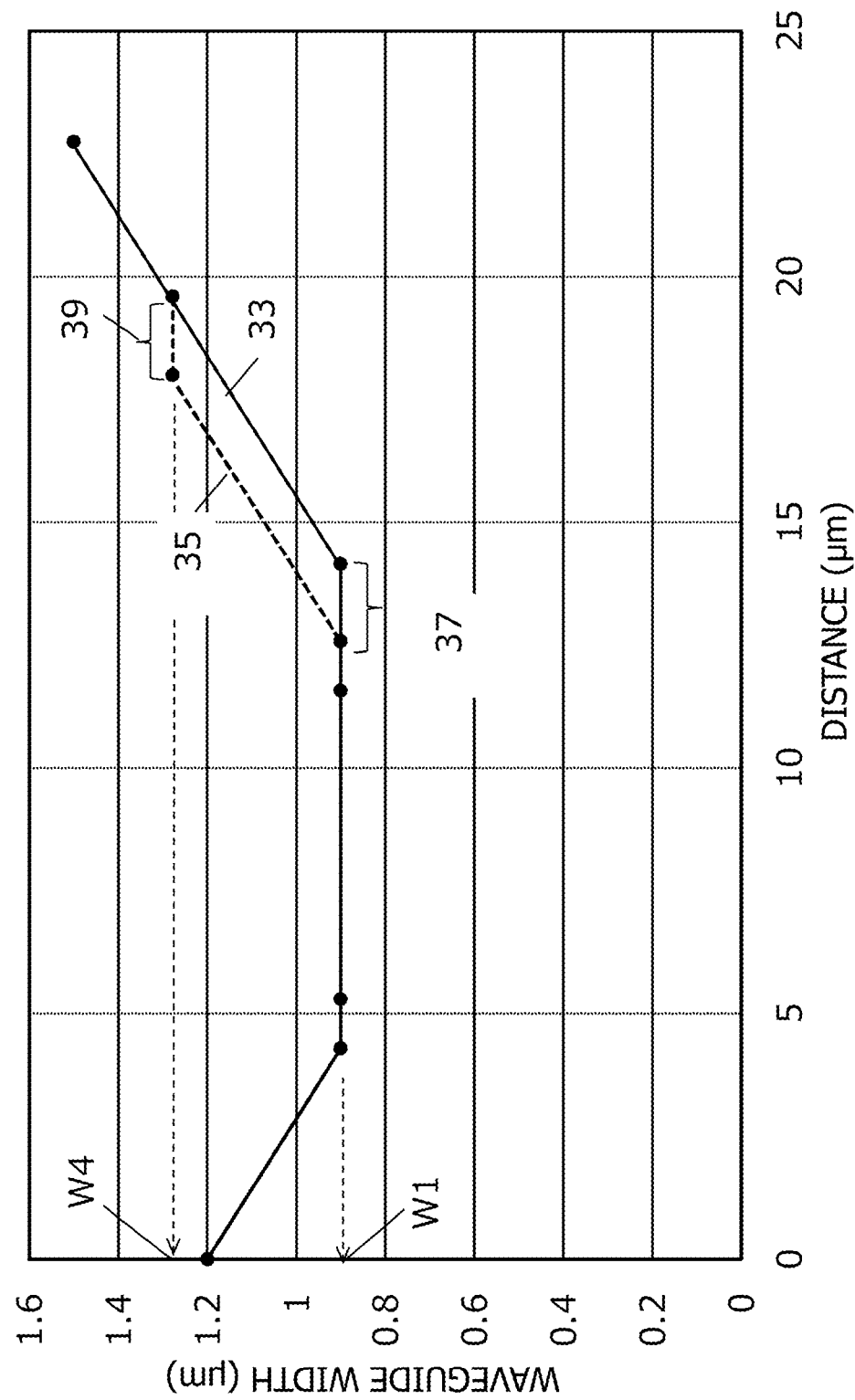
FIG. 7 is a diagram in which the width W (z) (a solid line 33) of the arm waveguides 14 illustrated in FIG. 3 and the width W (z) (a dashed line 35) of the arm waveguides 14 illustrated in FIG. 4 are represented in one graph.

FIG. 7 is a diagram in which the width W (z) (a solid line 33) of the arm waveguides 14 illustrated in FIG. 3 and the width W (z) (a dashed line 35) of the arm waveguides 14 illustrated in FIG. 4 are represented in one graph.

As illustrated in FIG. 7, a part 37 of the solid line 33 indicates a width W1 of a linear waveguide 222a illustrated in FIG. 3. A part 39 of the dashed line 35 indicates a width W4 of a linear waveguide 222b illustrated in FIG. 4.

The width W1 of the linear waveguide 222a differs from the width W4 of the linear waveguide 222b. Furthermore, a length of the linear waveguide 222a also slightly differs from a length of the linear waveguide 222b. An effective refractive index of an optical waveguide is dependent on a waveguide width. Therefore, an optical path length of the linear waveguide 222a differs from an optical path length of the linear waveguide 222b. Due to the differences in optical path lengths, four beams of interfering light with phases that differ from each other by 90° are outputted from the optical combiner 12 (refer to the second embodiment). Hereinafter, the linear waveguide 222a and the linear waveguide 222b will be referred to as phase-shift waveguides. Linear waveguides other than phase-shift waveguides will be referred to as propagation waveguides.

An optical path length of a waveguide consisting of the arm waveguides 14 illustrated in FIG. 3 other than the phase-shift waveguide 222a coincides with an optical path length of a waveguide consisting of the arm waveguides 14 illustrated in FIG. 4 other than the phase-shift waveguide 222b.

Specifically, a sum of lengths of the propagation waveguides of the arm waveguides 14 illustrated in FIG. 3 coincides with a sum of lengths of the propagation waveguides of the arm waveguides 14 illustrated in FIG. 4. Furthermore, a width of the propagation waveguides of the arm waveguides 14 illustrated in FIG. 3 also coincides with a width of the propagation waveguides of the arm waveguides 14 illustrated in FIG. 4. Therefore, a sum of optical path lengths of the propagation waveguides of the arm waveguides 14 illustrated in FIG. 3 coincides with a sum of optical path lengths of the propagation waveguides of the arm waveguides 14 illustrated in FIG. 4.

Furthermore, a sum of lengths of the tapered waveguides 18 of the arm waveguides 14 illustrated in FIG. 3 coincides with a sum of lengths of the tapered waveguides 18 of the arm waveguides 14 illustrated in FIG. 4.

Furthermore, a taper angle of the tapered waveguides 18 of the arm waveguides 14 illustrated in FIG. 3 coincides with a taper angle of the tapered waveguides 18 of the arm waveguides 14 illustrated in FIG. 4. Therefore, a sum of optical path lengths of the tapered waveguides 18 of the arm waveguides 14 illustrated in FIG. 3 coincides with a sum of optical path lengths of the tapered waveguides 18 of the arm waveguides 14 illustrated in FIG. 4.

Furthermore, a length and a width of the bend waveguide of the arm waveguides 14 illustrated in FIG. 3 are the same as a length and a width of the bend waveguide of the arm waveguides 14 illustrated in FIG. 4. Therefore, an optical path length of the bend waveguide 16 of the arm waveguides 14 illustrated in FIG. 3 coincides with an optical path length of the bend waveguide 16 of the arm waveguides 14 illustrated in FIG. 4.

Therefore, the optical path length of a waveguide consisting of the arm waveguides 14 illustrated in FIG. 3 other than the phase-shift waveguide 222a coincides with the optical path length of the waveguide consisting of the arm waveguides 14 illustrated in FIG. 4 other than the phase-shift waveguide 222b. The optical path length of the parts of the arm waveguide 14 other than the phase-shift waveguide 222a refers to a sum of the sum of optical path lengths of the propagation waveguides, the sum of optical path lengths of the tapered waveguides, and the optical path length of the bend waveguide.

Therefore, the respective arm waveguides 14 of the 90-degree optical hybrid 8 are configured so that optical path lengths of their parts other than the phase-shift waveguides 222a and 222b coincide with each other.

Usage

Signal light S (refer to FIG. 1) is inputted to one of the optical splitters 10, and reference light LO with a wavelength that is approximately the same as a wavelength of the signal light is inputted to the other optical splitter 10. Each of the two optical splitters 10 splits the signal light S or the reference light LO and inputs each beam of the splitted signal light S or each beam of the splitted reference light LO to any of the two optical combiners 12 via the arm waveguides 14. Each of the two optical combiners 12 mixes a beam of the splitted signal light S and a beam of the splitted reference light LO and outputs four beams of interfering light Ip, In, Qp, and Qn with phases that differ from each other by approximately 90 degrees.

The arm waveguides 14 (refer to FIG. 2) according to the first embodiment are optical waveguides that are separated from each other. Therefore, compared to a 90-degree optical hybrid (e.g., refer to Japanese Patent Application Laid-open No. 2011-18002) in which arm waveguides cross each other, the 90-degree optical hybrid 8 according to the first embodiment produces significantly less crosstalk.

(4) Manufacturing Method

Figure 8:
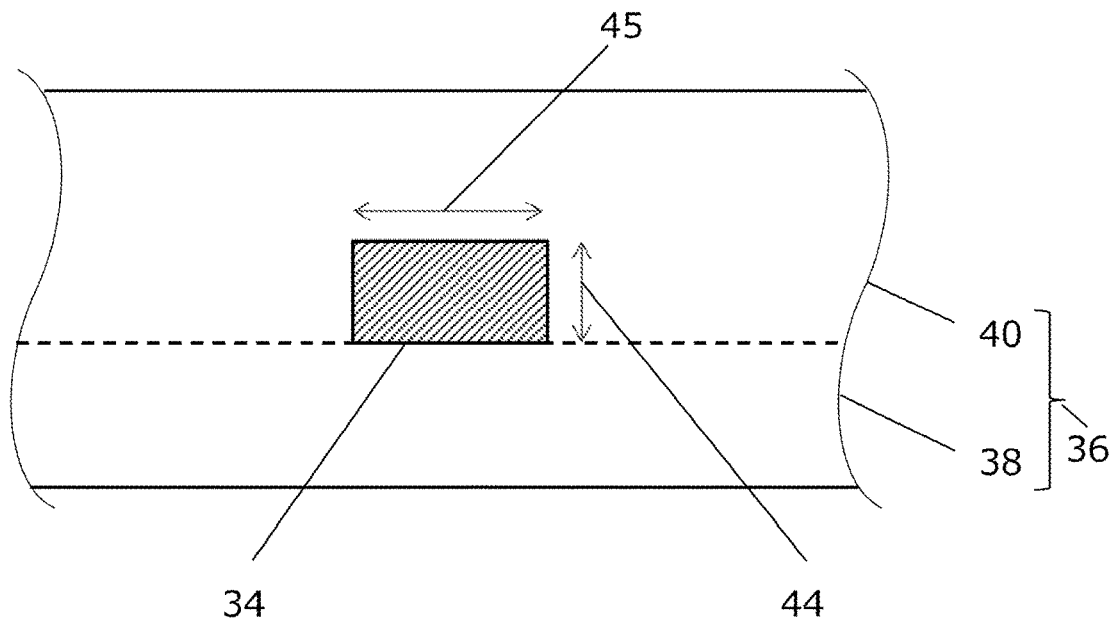
FIG. 8 is a diagram illustrating an example of a sectional view of the 90-degree optical hybrid 8 taken along line VIII-VIII in FIG. 2.

FIG. 8 is a diagram illustrating an example of a sectional view of the 90-degree optical hybrid 8 taken along line VIII-VIII in FIG. 2. The 90-degree optical hybrid 8 has a core 34 and a clad 36 that encloses the core. For instance, the core 34 of the 90-degree optical hybrid 8 is formed by etching an upper Si layer of a silicon-on-insulator (SOI) wafer via an etching mask. The etching mask is formed by photolithography. The formed core 34 is band-shaped silicon. A thickness 44 of the core 34 is, for instance, 100 to 1000 nm.

For instance, the clad 36 of the 90-degree optical hybrid has a lower clad layer 38 and an upper clad layer 40. For instance, the lower clad layer 38 is a $SiO_2$ layer formed of a buried oxide (BOX) layer of a SOI wafer. For instance, the upper clad layer 40 is a $SiO_2$ layer deposited on a SOI wafer in which the core 34 has been formed.

(5) Loss Reduction (5-1) Loss Reduction in Optical Splitter 10, Optical Combiner 12, and Bend Waveguide 16

The optical splitter 10 is, for instance, a 1×2 MMI or a Y-branching optical waveguide. The optical combiner 12 is, for instance, a 2×2 MMI. With an MMI, the wider the width of the input/output ports (in other words, a region where light is inputted to or outputted from), the lower an insertion loss of the MMI (e.g., refer to Zhen Shang, et al., "A Compact and Low-Loss MMI Coupler Fabricated With CMOS Technology," IEEE Photonics Journal, vol. 4, no. 6, 2012).

With a Y-branching waveguide, the narrower a gap between waveguides in a portion where an optical waveguide branches (in other words, a branching portion), the lower a loss of the Y-branching waveguide. Therefore, in principle, a Y-branching waveguide is able to be made loss-free by eliminating the gap between optical waveguides in the branching portion.

However, since there is a limit to resolution in photolithography, it is difficult to make the gap between optical waveguides in the branching portion sufficiently narrow. Therefore, in a real-life Y-branching waveguide, light that is propagated through the Y-branching waveguide is scattered at the branching portion. As a result, scattering loss is generated.

The wider a width of waveguides (in other words, branching waveguides) that branch at the branching portion, the lower a ratio of light that seeps out between the branching waveguides. Therefore, the wider the width of the branching waveguides, the lower a ratio of light that is scattered at the branching portion. As a result, the wider the width of the input/output ports, the lower the loss of the Y-branching waveguide.

As described above, the optical splitter 10 and the optical combiner 12 are realized by an MMI, a Y-branching waveguide, or the like. Since the wider the width of the input/output ports, the lower the loss of the MMI and the Y-branching waveguide, the wider the width of the output port $P_{out}$, the lower the loss of the optical splitter 10. In a same manner, the wider the width of the input port $P_{in}$, the lower the loss of the optical combiner 12.

This tendency becomes more apparent as a relative refractive index difference between the core 34 and the clad 36 increases. For instance, the tendency described above is apparent when the core 34 is a Si layer and the clad 36 is $SiO_2$. A great relative refractive index difference between a core and a clad is beneficial in terms of downsizing an optical waveguide device.

Figure 9:
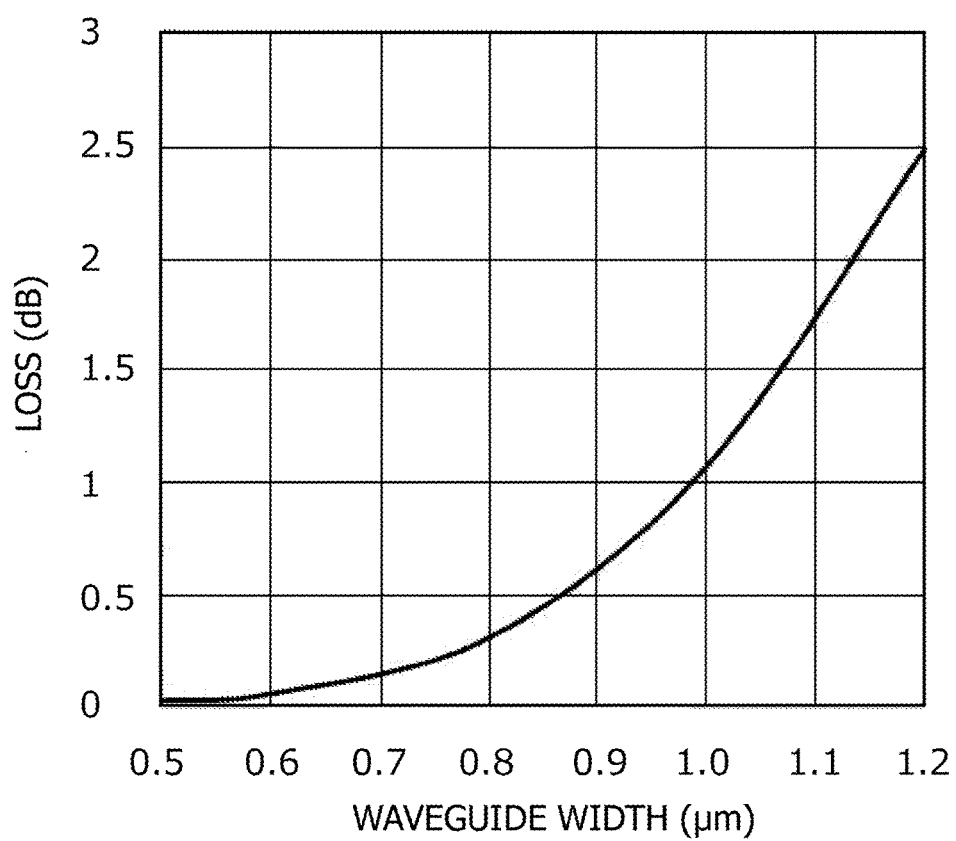
FIG. 9 is a diagram illustrating an example of a relationship between a width 45 of the bend waveguide 16 and its loss.

FIG. 9 is a diagram illustrating an example of a relationship between a width 45 of the bend waveguide 16 and its loss. An abscissa represents the width of the bend waveguide 16. An ordinate represents an insertion loss of the bend waveguide 16.

Figure 10:
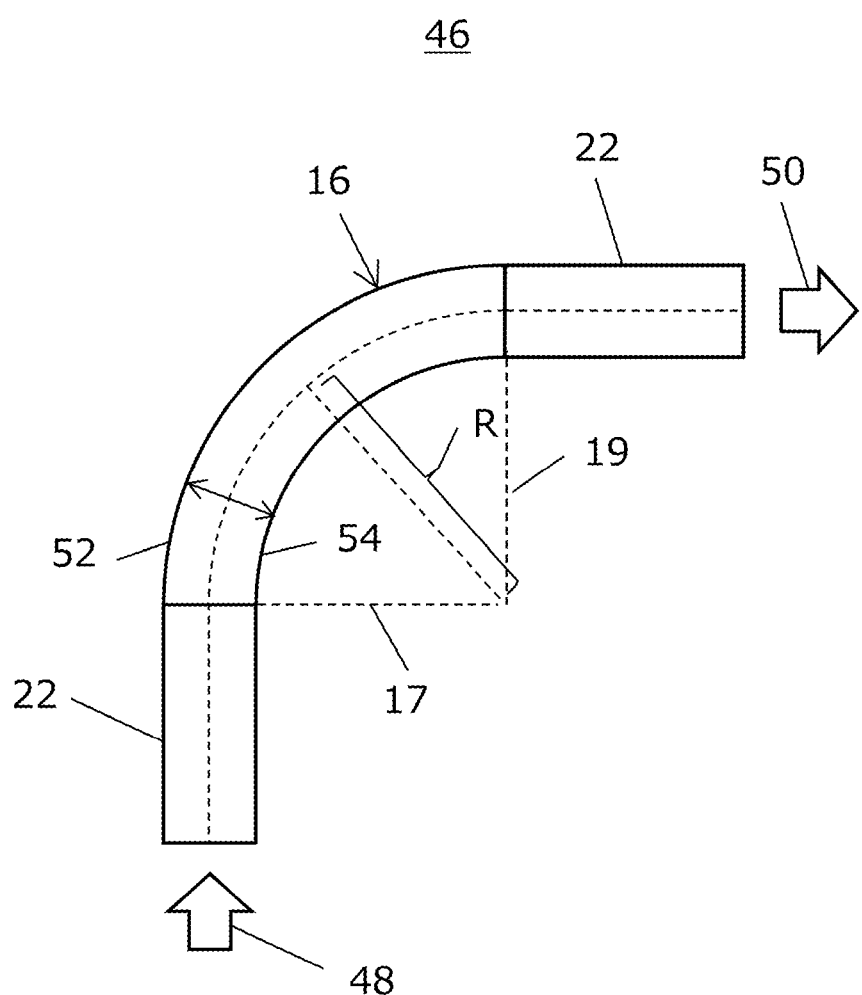
FIG. 10 is a plan view of an optical waveguide 46 used to calculate the loss in FIG. 9.

FIG. 10 is a plan view of an optical waveguide 46 used to calculate the loss in FIG. 9. The linear waveguides 22 are connected to both ends of the bend waveguide 16. When input light 48 is inputted to the bend waveguide 16 via one of the linear waveguides 22, output light 50 is outputted via the other linear waveguide 22. The loss of the bend waveguide 16 is calculated based on an intensity ratio between the output light 50 and the input light 48. The respective intensities of the output light 50 and the input light 48 are calculated by the finite element method and the finite-difference time-domain method.

The thickness 44 of the optical waveguide 46 used for the calculation is 220 nm. The core 34 of the optical waveguide 46 is Si. The clad 36 is $SiO_2$. A curvature radius (i.e. radius of curvature) R of the bend waveguide 16 used for the calculation is 4 μm. The curvature radius R of the bend waveguide 16 refers to an average value of respective curvature radii of a side surface 52 on an outer circumferential side and a side surface 54 on an inner circumferential side. A wavelength of the input light 48 is 1.55 μm. An angle between two radii 17 and 19 that pass through both ends of the bend waveguide 16 is 90°.

When the bend waveguide 16 is a multi-mode waveguide, an electric field distribution of propagating light (in other words, light that propagates along the waveguide) of the bend waveguide 16 is eccentrically located on the outer circumferential side. Therefore, a mismatch in electric field distribution is generated at an interfacial boundary between the linear waveguide 22 and the bend waveguide 16 and, consequently, loss is generated.

The wider the width of the bend waveguide 16, the greater the eccentricity of the electric field distribution in the bend waveguide 16. Therefore, the wider the width of the bend waveguide 16, the higher the loss of the bend waveguide 16. This tendency becomes more apparent as the relative refractive index difference between the core and the clad increases.

Therefore, as illustrated in FIG. 9, the wider the waveguide width, the higher the loss of the bend waveguide 16. Conversely, the narrower the waveguide width, the lower the loss of the bend waveguide 16. In the example illustrated in FIG. 9, light propagating in the bend waveguide 16 becomes multi-mode when the width of the bend waveguide 16 is 0.46 μm or more.

Since the arm waveguide 14 according to the first embodiment has the tapered waveguide 18 with a width that gradually decreases toward the bend waveguide 16, with the 90-degree optical hybrid according to the first embodiment, both a wide width of the output port $P_{out}$ of the optical splitter 10 and a narrow width of the bend waveguide 16 are able to be realized. In a same manner, with the 90-degree optical hybrid according to the first embodiment, both a wide width of the input port $P_{in}$ of the optical combiner 12 and a narrow width of the bend waveguide 16 are able to be realized.

Therefore, according to the first embodiment, loss reduction is able to be achieved in each of the optical splitter 10, the optical combiner 12, and the bend waveguide 16. The width of the end surface 24 (refer to FIGS. 3 and 4) of the arm waveguide 14 on the side of the optical splitter 10 is, for instance, 0.7 μm to 1.7 μm. The width of the end surface 26 of the arm waveguide 14 on the side of the optical combiner 12 is, for instance, 1.0 μm to 2.0 μm. The width of the bend waveguide 16 is, for instance, 0.6 μm to 1.2 μm.

(5-2) Loss Reduction in Arm Waveguide 14

Figure 11:
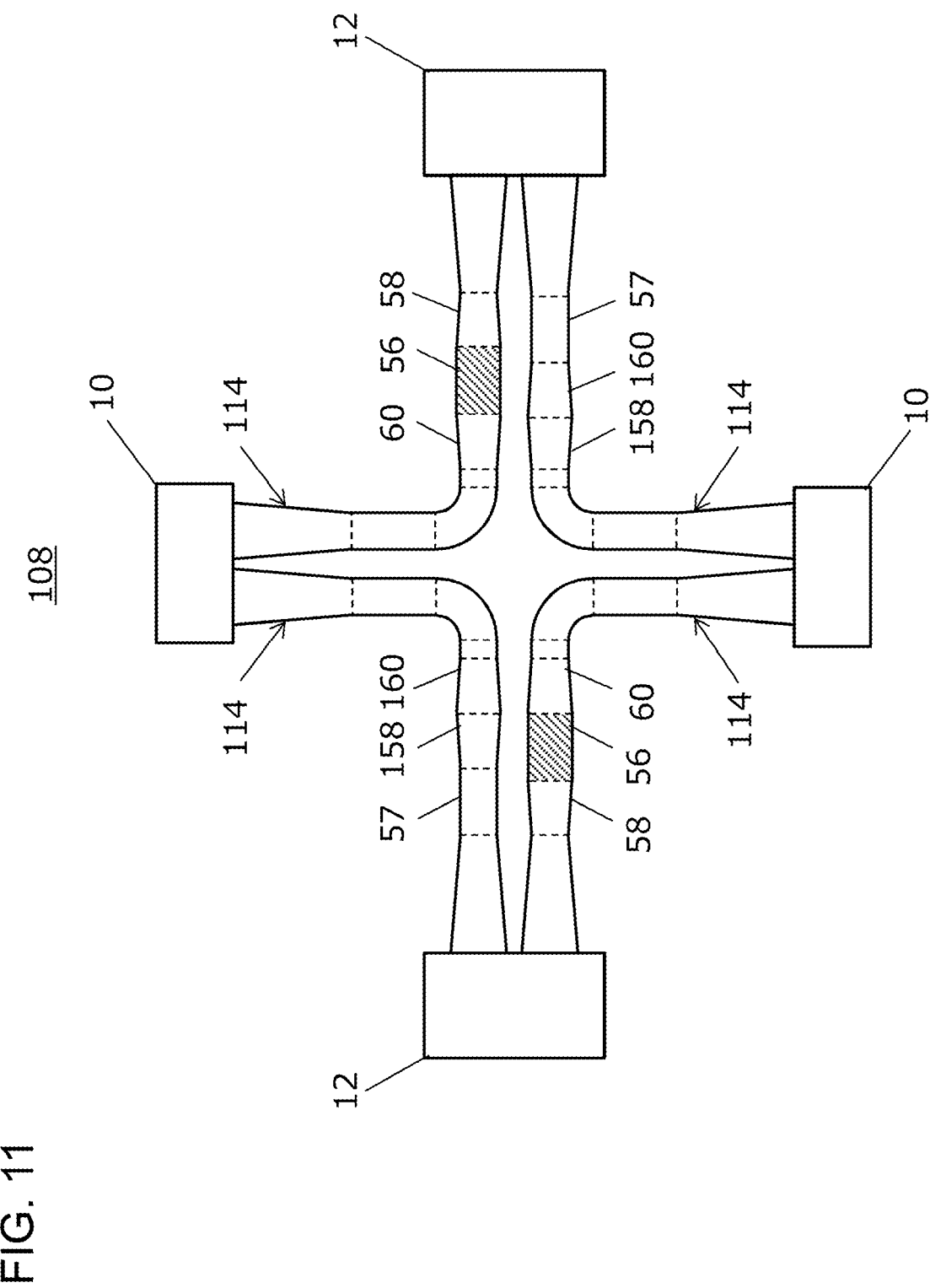
FIG. 11 represents an example of a plan view of a 90-degree optical hybrid 108 in which a width of a phase-shift waveguide 56 is wider than a width of a propagation waveguide 57.

FIG. 11 represents an example of a plan view of a 90-degree optical hybrid 108 in which a width of a phase-shift waveguide 56 is wider than a width of a propagation waveguide 57.

Figure 12:
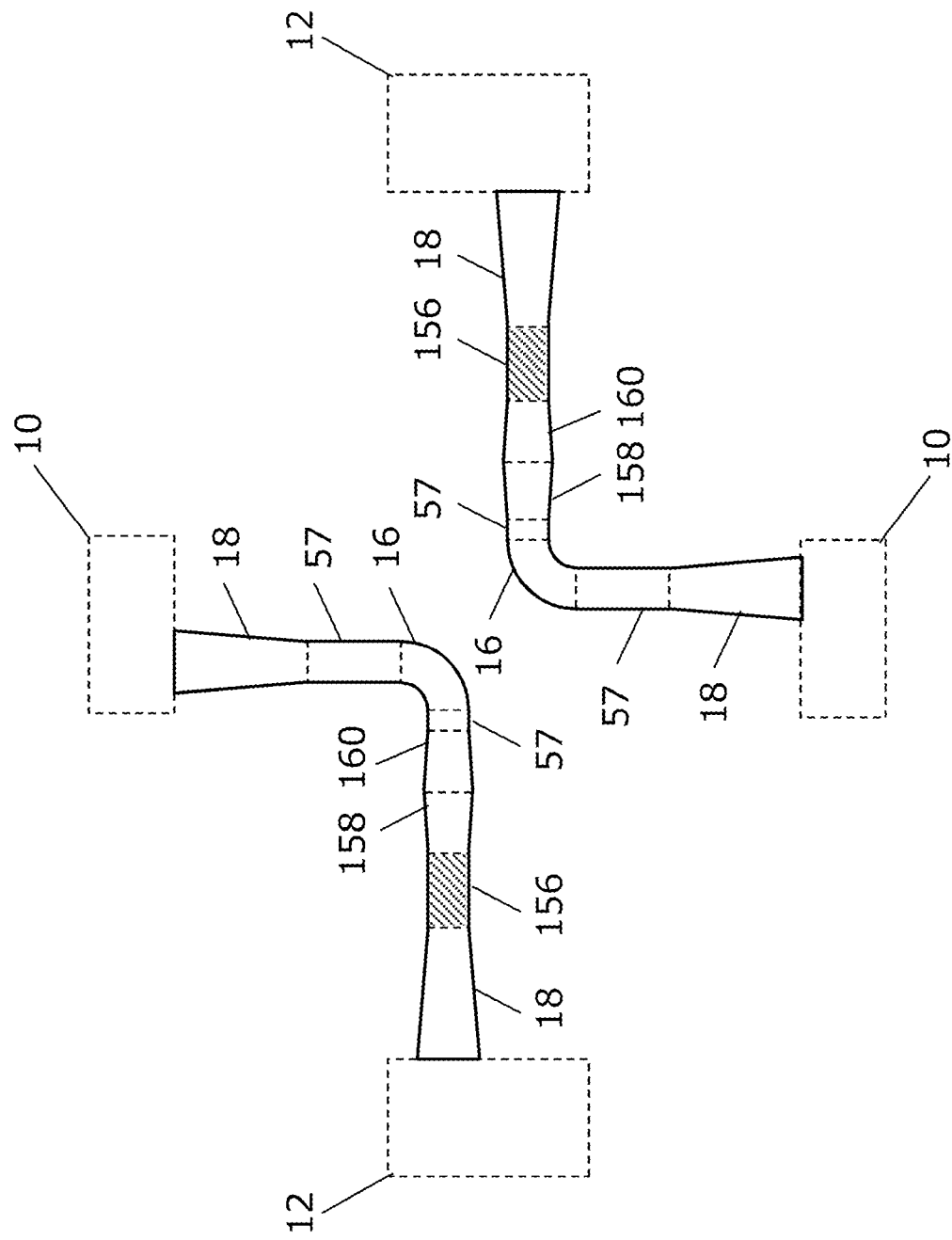
FIG. 12 is a diagram illustrating an upper-left arm waveguide 114 and a lower-right arm waveguide 114 in FIG. 11.
Figure 13:
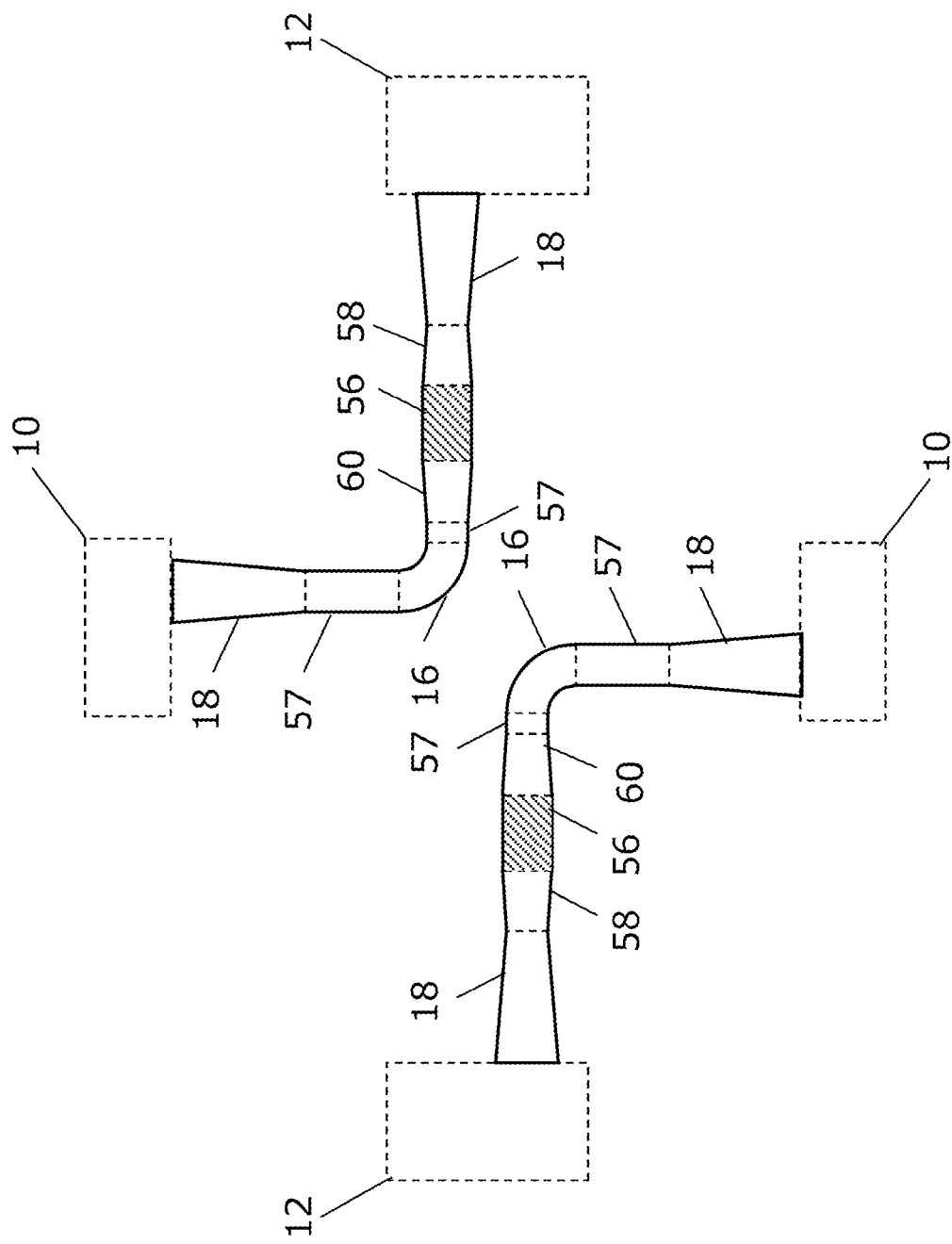
FIG. 13 is a diagram illustrating an upper-right arm waveguide 114 and a lower-left arm waveguide 114 in FIG. 11.

FIG. 12 is a diagram illustrating an upper-left arm waveguide 114 and a lower-right arm waveguide 114 in FIG. 11. FIG. 13 is a diagram illustrating an upper-right arm waveguide 114 and a lower-left arm waveguide 114 in FIG. 11. FIGS. 12 and 13 also depict the optical splitters 10 and the optical combiners 12 in dashed lines.

In the example illustrated in FIG. 11, the phase-shift waveguide 56 with a wide width is provided in the upper-right arm waveguide 114 and the lower-left arm waveguide 114 (FIG. 13). When waveguides with different width are connected to each other, a waveguide width changes discontinuously at a connection location of the waveguides. In order to suppress scattering loss of propagating light due to the discontinuous change in waveguide width, tapered waveguides 58 and 60 are connected to both ends of the wide-width phase-shift waveguide 56 (refer to FIG. 13). The tapered waveguides 58 and 60 are optical waveguides with a width that gradually increases toward the phase-shift waveguide 56.

The upper-left arm waveguide 114 (refer to FIG. 11) and the lower-right arm waveguide 114 are provided with tapered waveguides 158 and 160 (refer to FIG. 12) that are in contact with each other and a phase-shift waveguide 156 (refer to FIG. 12) with a same width as the propagation waveguide 57. The tapered waveguides 158 and 160 are provided so as to prevent the length of the arm waveguides 114 illustrated in FIG. 12 and the length of the arm waveguides 114 illustrated in FIG. 13 from becoming significantly different. A structure (the length, a taper angle, and the like) of the tapered waveguides 158 and 160 are the same as the structure of the tapered waveguides 58 and 60.

Due to the structures, the arm waveguides 114 illustrated in FIG. 12 and the arm waveguides 114 illustrated in FIG. 13 give phases that differ from each other by 90 degrees to electric fields of beams of reference light splitted by the optical splitter 10.

In the example illustrated in FIGS. 11 to 13, scattering loss due to discontinuity of the width of the waveguides is suppressed by the tapered waveguides 58 and 60. However, the arm waveguides 114 illustrated in FIGS. 11 to 13 have a problem in that the tapered waveguides 58 and 60 themselves give a non-negligible loss to propagating light.

The core of the tapered waveguides 58 and 60 and the like is formed by etching of a Si layer. The etching of the Si layer causes irregular roughness to be formed on a side wall (in other words, a side surface) of the core. The roughness of the side wall scatters propagating light and generates loss.

In order to reduce scattering loss due to discontinuity of the waveguide width, it is important to reduce the taper angle of the tapered waveguides 58 and 60. However, reducing the taper angle results in elongating the tapered waveguides 58 and 60 and, consequently, scattering loss of the tapered waveguides 58 and 60 themselves becomes non-negligible. Scattering loss of the tapered waveguides 158 and 160 of the arm waveguide 114 (refer to FIG. 12) not provided with the wide-width phase-shift waveguide 56 is equivalently non-negligible.

Therefore, the loss of the arm waveguides 114 illustrated in FIG. 13 which have the wide-width phase-shift waveguide 56 is increased by the tapered waveguides 58 and 60. The same applies to the arm waveguides 114 illustrated in FIG. 12 which have the tapered waveguides 158 and 160.

Scattering loss due to side wall roughness of an optical waveguide is particularly problematic in an optical waveguide with a great relative refractive index difference between a core and a clad (e.g., an optical waveguide having a Si core and a $SiO_2$ clad). This is because the greater the relative refractive index difference, the greater the concentration of propagating light in a vicinity of a side wall and the greater the scattering due to side wall roughness.

Since each optical waveguide 20 of the arm waveguide 14 according to the first embodiment is either the tapered waveguide 18 with a width that gradually decreases toward the bend waveguide 16 or the linear waveguide 22 with a constant width, the wide-width phase-shift waveguide 56 is not included. Therefore, the loss of the arm waveguide 14 according to the first embodiment is not increased by the tapered waveguides 58, 60 (refer to FIG. 11) that are connected to both ends of the wide-width phase-shift waveguide 56 and the tapered waveguides 158, 160 (refer to FIG. 12) accompanying the tapered waveguides 58, 60. Consequently, according to the first embodiment, loss reduction of the arm waveguide 14 is able to be achieved.

As described above, according to the first embodiment, loss reduction is able to be achieved in each of the optical splitters 10, the optical combiners 12, the bend waveguides 16, and the optical waveguides 20 of the arm waveguides 14. Therefore, according to the first embodiment, loss reduction of the 90-degree optical hybrid is able to be achieved.

(6) Suppression of Phase Error

The phases given to an electric field of propagating light by the arm waveguides 14 and 114 are dependent on the widths of the arm waveguides 14 and 114. Therefore, when a width of a core formed by etching or the like deviates from a design value, the phases given to an electric field of propagating light by the arm waveguides 14 and 114 also deviate from design values.

Since the arm waveguides 114 illustrated in FIG. 11 having the wide-width phase-shift waveguide 56 include a great number of elongated tapered waveguides, a phase error of the arm waveguide 114 due to a deviation of the core width from the design value is great. In this case, a phase error refers to a deviation of a phase from a design value. The deviation of a core width or the like from a design value represents an error during a manufacturing process (in other words, a manufacturing error), e.g., etching.

Since each optical waveguide 20 in the arm waveguide 14 according to the first embodiment is either the tapered waveguide 18 with a width that gradually decreases toward the bend waveguide 16 or the linear waveguide 22 with a constant width, the wide-width phase-shift waveguide 56 is not included in the arm waveguides 14. Therefore, tapered waveguides included in the arm waveguide 14 according to the first embodiment are few and the phase error of the 90-degree optical hybrid 8 according to the first embodiment is slight.

In other words, the 90-degree optical hybrid 8 according to the first embodiment includes neither the tapered waveguides 58 and 60 on both sides of the wide-width phase-shift waveguide 56 nor the tapered waveguides 158 and 160 for length adjustment of the arm waveguide 114. Therefore, a phase error due to manufacturing error of the tapered waveguides 58, 60, 158, and 160 does not occur in the 90-degree optical hybrid 8 according to the first embodiment.

Therefore, with the 90-degree optical hybrid 8 according to the first embodiment, a phase error due to a deviation of a core width from a design value is able to be suppressed.

A phase error in a case where the width of the tapered waveguides 58 and 60 deviate from a design value by 1 nm will now be estimated. It is assumed that a material and a thickness of the tapered waveguides 58 and 60 are the same as the material and the thickness of the bend waveguide 16 described with reference to FIG. 10.

Figure 14:
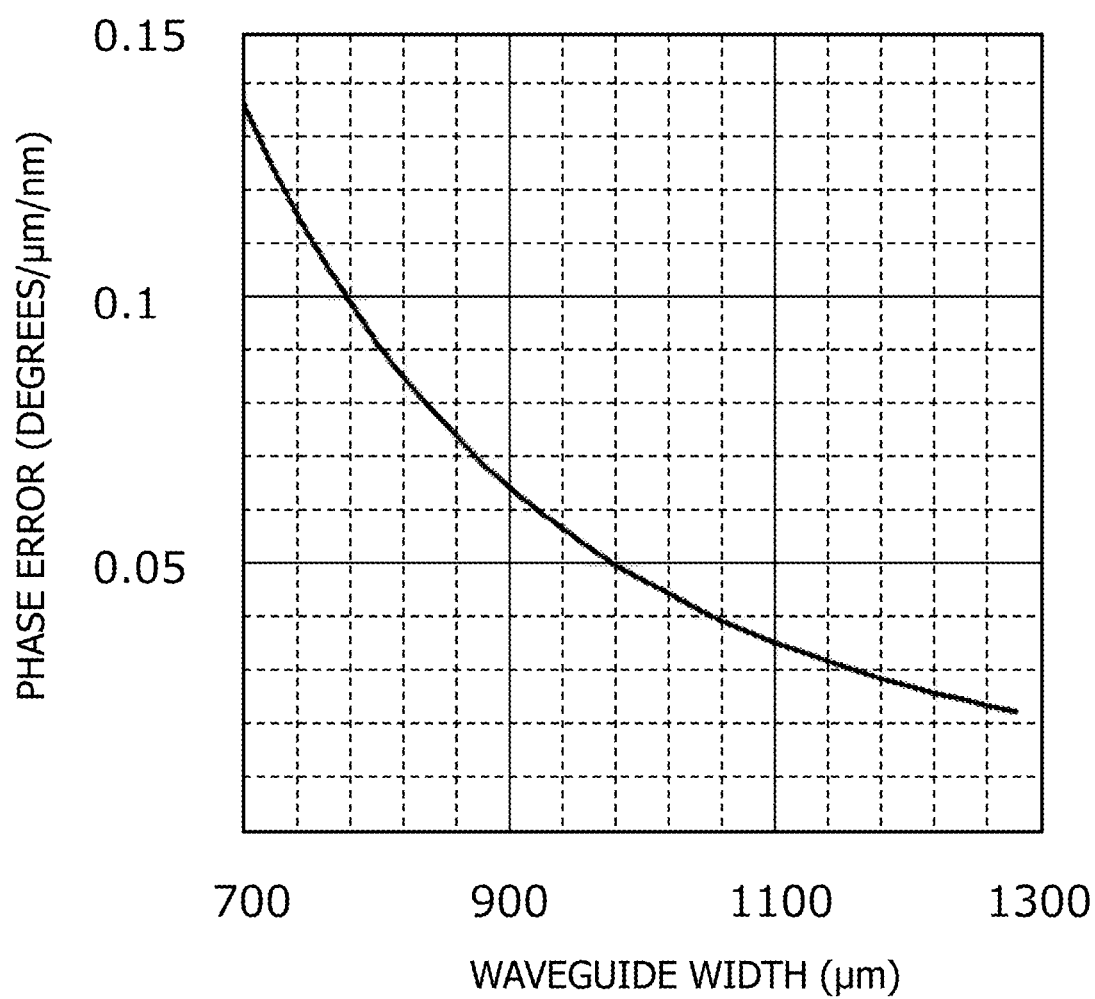
FIG. 14 is a diagram illustrating a relationship between a phase error per 1 nm of manufacturing error of a linear waveguide and a width of the linear waveguide.

FIG. 14 is a diagram illustrating a relationship between a phase error per 1 nm of manufacturing error of a linear waveguide and a width of the linear waveguide. An abscissa represents the width of the linear waveguide. An ordinate represents a phase error per 1 nm of manufacturing error. The phase error illustrated in FIG. 14 is a phase error per 1 nm of manufacturing error when a length of the linear waveguide is 1 µm. The relationship illustrated in FIG. 14 is calculated by the finite element method. A material and a thickness of the linear waveguide are assumed to be the same as those of the bend waveguide 16 described with reference to FIG. 10. A wavelength of propagating light is set to 1.55 µm.

As illustrated in FIG. 14, the wider a waveguide width, the slighter the phase error of the linear waveguide. Therefore, a phase error of the tapered waveguides 58 and 60 is conceivably larger than a phase error of a linear waveguide with a same width as a maximum width of the tapered waveguides 58 and 60. Based on FIG. 14, a sum of the phase differences of the tapered waveguides 58 and 60 is estimated to be larger than 0.24°. A length of the tapered waveguides 58 and 60 for estimation is set to 5.4 µm. A taper angle of the tapered waveguides 58 and 60 is set to 2°. A maximum width of the tapered waveguides 58 and 60 is set to 1278 nm.

A typical allowable error of a 90-degree optical hybrid is 5°. Therefore, the phase error of 0.24° of the tapered waveguides 58 and 60 is non-negligible in light of an allowable error of 5°. Therefore, the optical hybrid 8 according to the first embodiment which does not include the wide-width phase-shift waveguide 56 is also excellent from the perspective of reducing phase error.

In the first embodiment, the optical splitter 10 and the optical combiner 12 are connected by the tapered waveguide 18 with a width that gradually narrows toward the bend waveguide 16 and by the linear waveguides 22. Therefore, the width of the input port $P_{in}$ of the optical combiner 12 and the output port $P_{out}$ of the optical splitter 10 become wider, and the width of the bend waveguide 16 becomes narrower. As a result, loss reduction in the optical splitter 10, the optical combiner 12, and the bend waveguide 16 is able to be achieved.

Furthermore, since each optical waveguide 20 in the arm waveguide 14 is either the tapered waveguide 18 with a width that gradually decreases toward the bend waveguide 16 or the linear waveguide 22 with a constant width, the wide-width phase-shift waveguide 56 is not included. Therefore, the arm waveguide 14 according to the first embodiment does not include the tapered waveguides 58 and 60 that are connected to both ends of the wide-width phase-shift waveguide 56. Consequently, loss of the arm waveguide 14 according to the first embodiment is low.

As described above, according to the first embodiment, loss reduction is able to be achieved in each of the optical splitter 10, the optical combiner 12, the bend waveguide 16, and the optical waveguides 20 of the arm waveguide 14. Therefore, according to the first embodiment, loss reduction of the 90-degree optical hybrid is able to be achieved.

Second Embodiment

A second embodiment is almost equivalent to the first embodiment. Therefore, descriptions of the same configurations and the like as in the first embodiment will be either omitted or simplified.

(1) Structure

Figure 15:
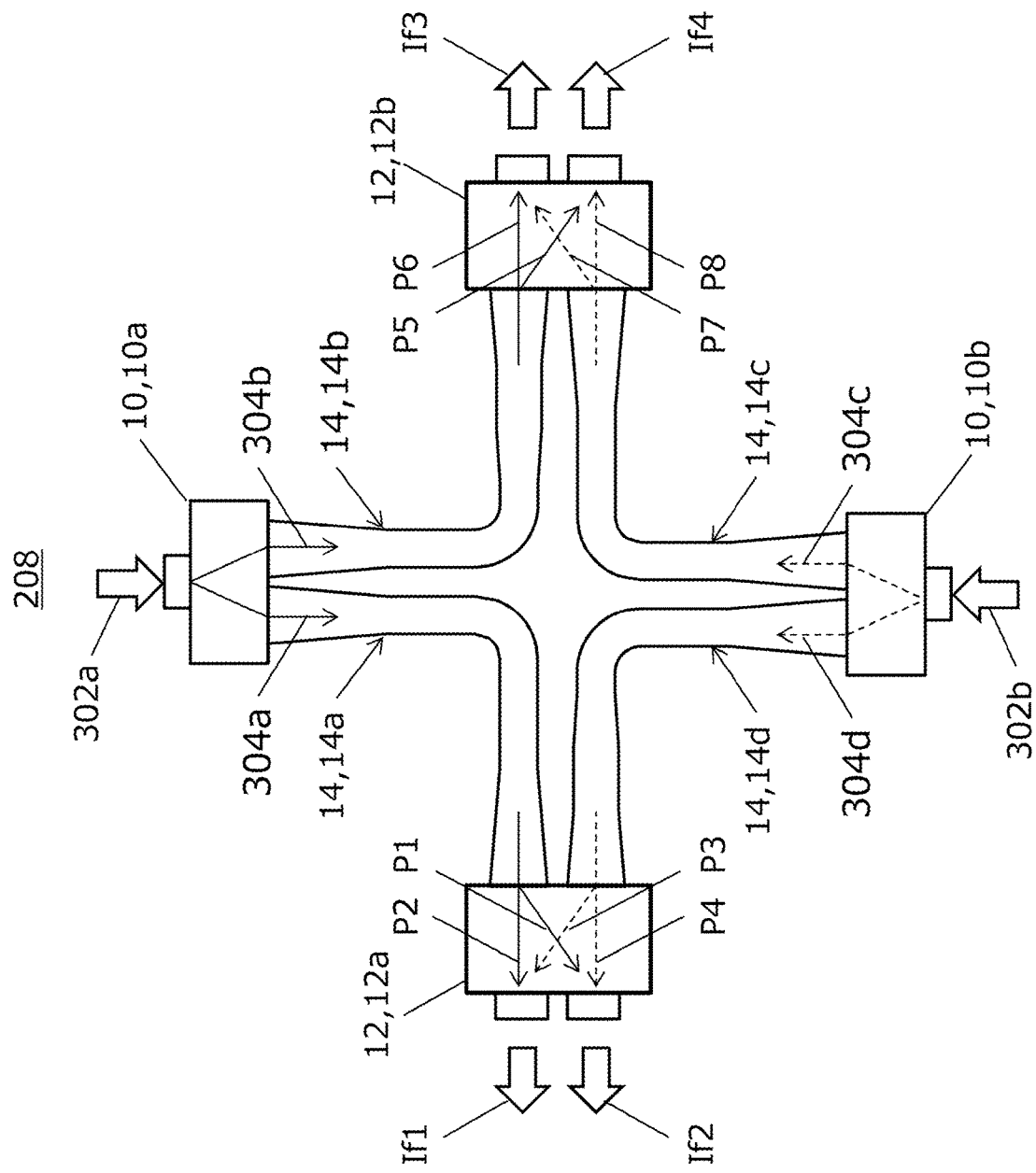
FIG. 15 is a diagram illustrating an example of a 90-degree optical hybrid 208 according to the second embodiment.

FIG. 15 is a diagram illustrating an example of a 90-degree optical hybrid 208 according to the second embodiment. The number and arrangement of the respective optical waveguides (in other words, the tapered waveguide 18, the linear waveguide 22, and the bend waveguide 16) of the 90-degree optical hybrid 208 are the same as those of the 90-degree optical hybrid 8 according to the first embodiment having been described with reference to FIGS. 2 to 4.

The two optical splitters 10 according to the second embodiment are a first optical splitter 10a and a second optical splitter 10b. The first optical splitter 10a splits first light 302a inputted therein into first split light 304a and second split light 304b. The second optical splitter 10b splits second light 302b inputted therein into third split light 304c and fourth split light 304d.

The four arm waveguides 14 according to the second embodiment are a first arm waveguide 14a, a second arm waveguide 14b, a third arm waveguide 14c, and a fourth arm waveguide 14d. The two optical combiners 12 according to the second embodiment are a first optical combiner 12a and a second optical combiner 12b.

The first arm waveguide 14a inputs the first split light 304a into the first optical combiner 12a. The second arm waveguide 14b inputs the second split light 304b into the second optical combiner 12b. The third arm waveguide 14c inputs the third split light 304c into the second optical combiner 12b. The fourth arm waveguide 14d inputs the fourth split light 304d into the first optical combiner 12a.

Let $\phi 1$ denote a phase given by the first arm waveguide 14a to an electric field of the first split light 304a and $\phi 2$ denote a phase given by the second arm waveguide 14b to an electric field of the second split light 304b. Furthermore, let $\phi 3$ denote a phase given by the third arm waveguide 14c to an electric field of the third split light 304c and $\phi 4$ denote a phase given by the fourth arm waveguide 14d to an electric field of the fourth split light 304d.

The 90-degree optical hybrid 208 according to the second embodiment is configured so that, when respective wavelengths $\lambda$ of the first light 302a and the second light 302b are a specific wavelength $\lambda_0$ (e.g., 1547.5 nm), a phase difference $\theta$ satisfies expressions (1) and (2).

$$\theta = (\phi 2 - \phi 1) + (\phi 4 - \phi 3) \tag{1}$$

$$90° - \Delta + 360° \times m \leq |\theta| \leq 90° + \Delta + 360° \times m \tag{2}$$

In this case, $\Delta$ denotes an allowable error and m denotes an integer equal to or greater than 0. The allowable error is preferably 0° or more and 5° or less, more preferably 0° or more and 4° or less, and most preferably 0° or more and 3° or less. When the allowable error is 0° or more and 5° or less, an optical signal-to-noise ratio of interfering light (in other words, Qp, Qn, Ip, and In) that is outputted from the 90-degree optical hybrid 208 is suppressed to 0.5 dB or lower (e.g., refer to Japanese Patent Application Laid-open No. 2011-18002). The first light 302a is, for instance, signal light in digital coherent communication. The second light 302b is, for instance, reference light in digital coherent communication.

(2) Operation

The first optical splitter 10a gives an electric field of the second split light 304b a phase that is greater than a phase given to an electric field of the first split light 304a by precisely $A_{12}$ (e.g., 0° or ±180°). The second optical splitter 10b gives an electric field of the third split light 304c a phase that is greater than a phase given to an electric field of the fourth split light 304d by precisely $A_{34}$ (f e.g., 0° or ±180°). The first optical splitter 10a and the second optical splitter 10b are realized by, for instance, a 1×2 MMI.

The first optical combiner 12a gives an electric field of a first portion P1 of the first split light 304a a phase that is greater than a phase given to an electric field of a second portion P2 of the first split light 304a by −90°. The first optical combiner 12a further gives an electric field of a third portion P3 of the fourth split light 304d a phase that is greater than a phase given to an electric field of a fourth portion P4 of the fourth split light 304d by −90°.

While giving the phases described above to the electric fields of the second portion P2 and the third portion P3, the first optical combiner 12a combines the second portion P2 and the third portion P3 and generates and outputs interfering light If1. While giving the phases described above to the electric fields of the fourth portion P4 and the first portion P1, the first optical combiner 12a further combines the fourth portion P4 and the first portion P1 and generates and outputs interfering light If2.

The second optical combiner 12b gives an electric field of a fifth portion P5 of the second split light 304b a phase that is greater than a phase given to an electric field of a sixth portion P6 of the second split light 304b by −90°. The second optical combiner 12b further gives an electric field of a seventh portion P7 of the third split light 304c a phase that is greater than a phase given to an electric field of an eighth portion P8 of the third split light 304c by −90°.

While giving the phases described above to the electric fields of the sixth portion P6 and the seventh portion P7, the second optical combiner 12b combines the sixth portion P6 and the seventh portion P7 and generates and outputs interfering light If3. While giving the phases described above to the electric fields of the eighth portion P8 and the fifth portion P5, the second optical combiner 12b further combines the eighth portion P8 and the fifth portion P5 and generates and outputs interfering light If4.

As a result of the combining described above, a phase difference (=a−b) between a phase a of the interfering light If1 and a phase b of the interfering light If2 and a phase difference (=c−d) between a phase c of the interfering light If3 and a phase d of the interfering light If4 is 180°. Furthermore, a phase difference (=a−c) between the phase a of the interfering light If1 and the phase c of the interfering light If3 is $\theta+(A_{12}-A_{34})$. In a same manner, a phase difference (=b−d) between the phase b of the interfering light If2 and the phase d of the interfering light If4 is $\theta+(A_{12}-A_{34})$. $\theta$ denotes a phase difference that is given by expression (1) having been described in "(1) Structure".

Here, a case where $A_{12}$ and $A_{34}$ are equal and a sign of $\theta$ is positive will be considered. A case where $A_{12}$ and $A_{34}$ differ from one another will be described later. Since $\theta$ is approximately 90° when ignoring a phase difference 360°×m (where m is an integer) that is irrelevant with respect to intensity of interfering light, the phase difference (=a−c) between the phase a of the interfering light If1 and the phase c of the interfering light If3 is approximately 90°. In a same manner, the phase difference (=b−d) between the phase b of the interfering light If2 and the phase d of the interfering light If4 is approximately 90°.

To summarize the results described above, the phase difference (=a−c) between the phase a of the interfering light If1 and the phase c of the interfering light If3 and the phase difference (=b−d) between the phase b of the interfering light If2 and the phase d of the interfering light If4 are also approximately 90°. On the other hand, the phase difference (=a−b) between the phase a of the interfering light If1 and the phase b of the interfering light If2 is 180°. The phase difference (=c−d) between the phase c of the interfering light If3 and the phase d of the interfering light If4 is also 180°.

When $A_{12}$ and $A_{34}$ are equal to each other, the interfering light If1 satisfies the requirements of the interfering light Qp having been described with reference to FIG. 1 and the interfering light If2 satisfies the requirements of the interfering light Qn. The interfering light If3 satisfies the requirements of the interfering light Ip and the interfering light If4 satisfies the requirements of the interfering light In. Therefore, the 90-degree optical hybrid 208 according to the second embodiment satisfies the requirements of the 90-degree optical hybrid described in "(1) 90-degree Optical Hybrid" of the first embodiment.

The requirements of the 90-degree optical hybrid are also able to be satisfied by adopting a 2×2 MMI or a directional coupler as one of the optical splitters 10 (e.g., U.S. Patent Specification No. 10126498). The 2×2 MMI and the directional coupler give one of the beams of splitted light a phase that is greater by 90° than a phase given to the other beam of splitted light. Therefore, by adopting a 2×2 MMI or a directional coupler as one of the optical splitters 10, phases of beams of interfering light outputted from the 90-degree optical hybrid are able to be made to differ from each other by 90 degrees.

However, when one of the optical splitters 10 is a 2×2 MMI or a directional coupler, and when a wavelength of light inputted to the 90-degree optical hybrid deviates from an optimum wavelength, a phase difference between beams of interfering light that are outputted from the 90-degree optical hybrid also deviates from 90 degrees.

Light inputted into a 2×2 MMI is expanded into a great number of modes, and the inputted light is splitted by an interference phenomenon that occurs while the expanded modes propagate over a certain distance. Therefore, when a wavelength of the inputted light changes, an optical path length of an expanded mode changes and, consequently, a phase difference between electric fields of splitted light deviate from 90° (e.g., refer to Hang Guan, et al., "Compact and low loss 90° optical hybrid on a silicon-on-insulator platform", Optics EXPRESS, vol. 25, No. 23, 2017). In other words, a phase difference given to electric fields of light splitted by the 2×2 MMI is dependent on the wavelength of light inputted thereto.

Therefore, when one of the optical splitters 10 is a 2×2 MMI, the phase differences between beams of interfering light outputted from the optical combiners 12 are dependent on the wavelength of light inputted to the 90-degree optical hybrid. The same applies to a case where one of the optical splitters 10 is a directional coupler.

On the other hand, with the 90-degree optical hybrid 208 according to the second embodiment, phase differences among the beams of interfering light If1, If2, If3, and If4 are controlled by the arm waveguides 14 instead of an optical splitter. Therefore, with the 90-degree optical hybrid 208 according to the second embodiment, wavelength dependency of the phase differences between beams of interfering light is able to be suppressed. This is because when phase differences $A_{12}$ and $A_{34}$ that are given by the optical splitters 10 to the electric fields of splitted light are equal to each other, a phase difference ($=\theta+(A_{12}-A_{34})$) between the beams of interfering light If1 and If3 is solely dependent on a phase $\theta$ given by the arm waveguide 14 to the beams of split light 304a to 304d. The same applies to a phase difference between the beams of interfering light If2 and If4 ($=\theta+(A_{12}-A_{34})$).

(3) Modifications
(3-1) First Modification

The optical splitters 10 exemplified thus far are 1×2 MMIs. However, the optical splitter 10 may be a 2×2 MMI, a directional coupler, or a Y-branching waveguide.

Phase differences of electric fields of split light outputted from these optical devices vary. However, as long as $A_{12}$ and $A_{34}$ described above satisfy a certain condition (e.g., $A_{12}=A_{34}$) for devices, the devices are able to be used as the optical splitters 10 of the 90-degree optical hybrid 208.

As is apparent from the description of "(2) Operation", optical devices satisfying $A_{12}-A_34=0°$ are able to be used as the optical splitters 10. Optical devices that satisfy $A_{12}-A_34=\pm180°$ are also able to be used as the optical splitters 10 of the 90-degree optical hybrid 208.

In the case of $A_{12}-A_{34}=\pm180°$, the phase difference ($=\theta+(A_{12}-A_{34})$) between the interfering light If1 and the interfering light If3 is approximately 270° or approximately −90°. The same applies to the phase difference between the interfering light If2 and the interfering light If4. The phase difference between the interfering light If1 and the interfering light If2 is 180°. In a same manner, the phase difference between the interfering light If3 and the interfering light If4 is 180°.

When taking into consideration equivalence of phases that differ from each other by 360° in interfering light, phase intervals among the beams of interfering light If1 to If4 are approximately 90°. Therefore, devices that satisfies $A_{12}-A_34=\pm180°$ is also able to be used as the optical splitters 10 of the 90-degree optical hybrid 208.

In the case of $A_{12}-A_34=0°$, the beams of interfering light Qp and Qn are outputted from the first optical combiner 12a and the beams of interfering light Ip and In are outputted from the second optical combiner 12b. On the other hand, in the case of $A_{12}-A_34=\pm180°$, the beams of interfering light Qp and Qn are outputted from the second optical combiner 12b and the beams of interfering light Ip and In are outputted from the first optical combiner 12a. In other words, by satisfying $A_{12}-A_34=\pm180°$, beams of interfering light that are outputted from the optical combiners 12a and 12b are transposed. Therefore, according to the first modification, a degree of freedom in design of a 90-degree optical hybrid increases.

(3-2) Second Modification

Figure 16:
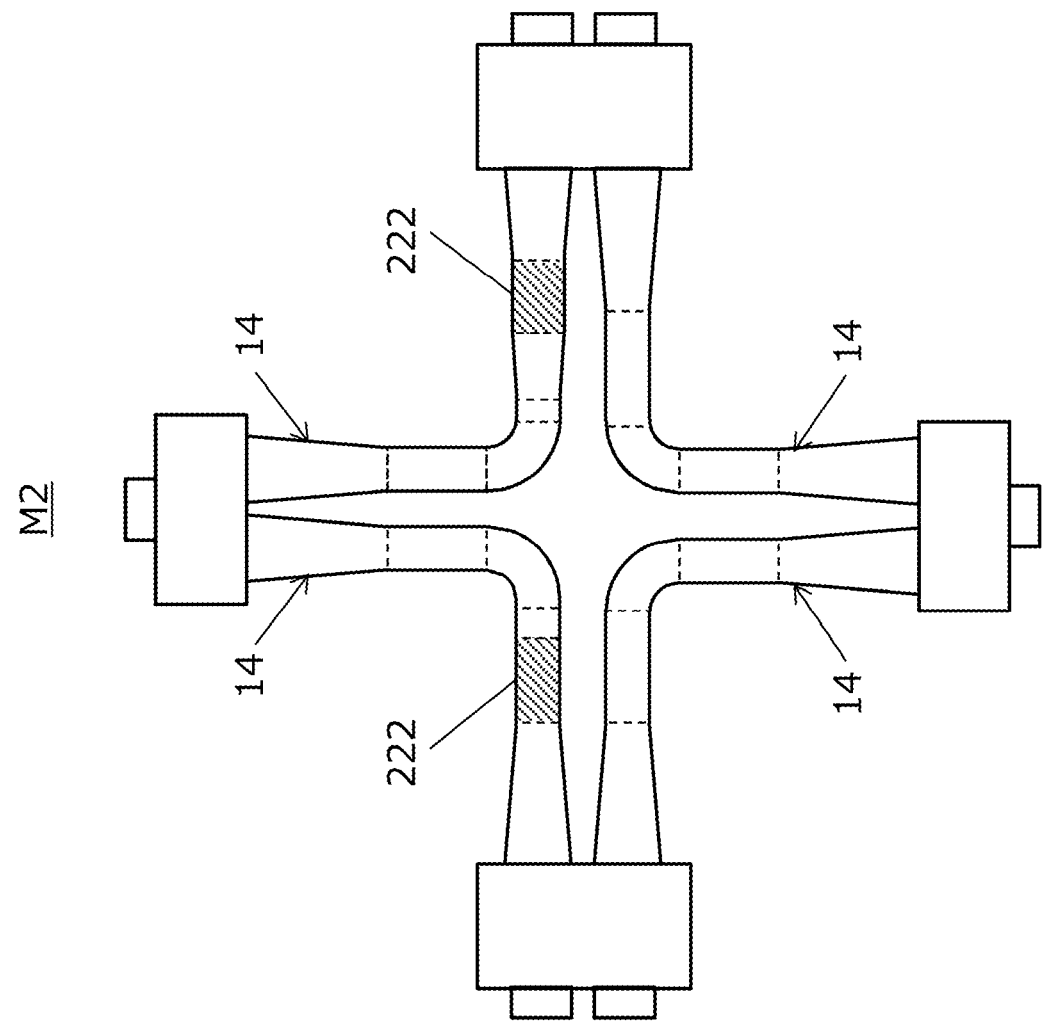
FIG. 16 is a plan view illustrating an example of a 90-degree optical hybrid M2 according to a second modification.

FIG. 16 is a plan view illustrating an example of a 90-degree optical hybrid M2 according to a second modification. In the examples illustrated in FIGS. 2 to 4, the phase-shift waveguide 222 is provided in each arm waveguide 14. However, in the second modification, as illustrated in FIG. 16, the phase-shift waveguide 222 is provided in only two of the four arm waveguides. According to the second modification, since variations in an arrangement method of a phase-shift waveguide increase, the degree of freedom in design of a 90-degree optical hybrid increases.

(3-3) Third Modification

FIGS. 17 and 18 are a plan view illustrating a 90-degree optical hybrid according to a third modification. In the examples illustrated in FIGS. 2 to 4, one phase-shift waveguide 222 is provided in one arm waveguide 14. On the other hand, in the third modification, as illustrated in FIGS. 17 and 18, a plurality of phase-shift waveguides 222 are provided in one arm waveguide 14.

According to the third modification, since variations in the number of phase-shift waveguides increase, the degree of freedom in design of a 90-degree optical hybrid increases.

(3-4) Fourth Modification

FIG. 19 is a plan view illustrating a 90-degree optical hybrid according to a fourth modification. In the examples illustrated in FIGS. 2 to 4, the phase-shift waveguide 222 is the linear waveguide 22. On the other hand, a phase-shift waveguide 218 according to the fourth modification is the tapered waveguide 18.

According to the fourth modification, since variations of a phase-shift waveguide increase, the degree of freedom in design of a 90-degree optical hybrid increases.

(3-5) Fifth Modification

Figure 20:
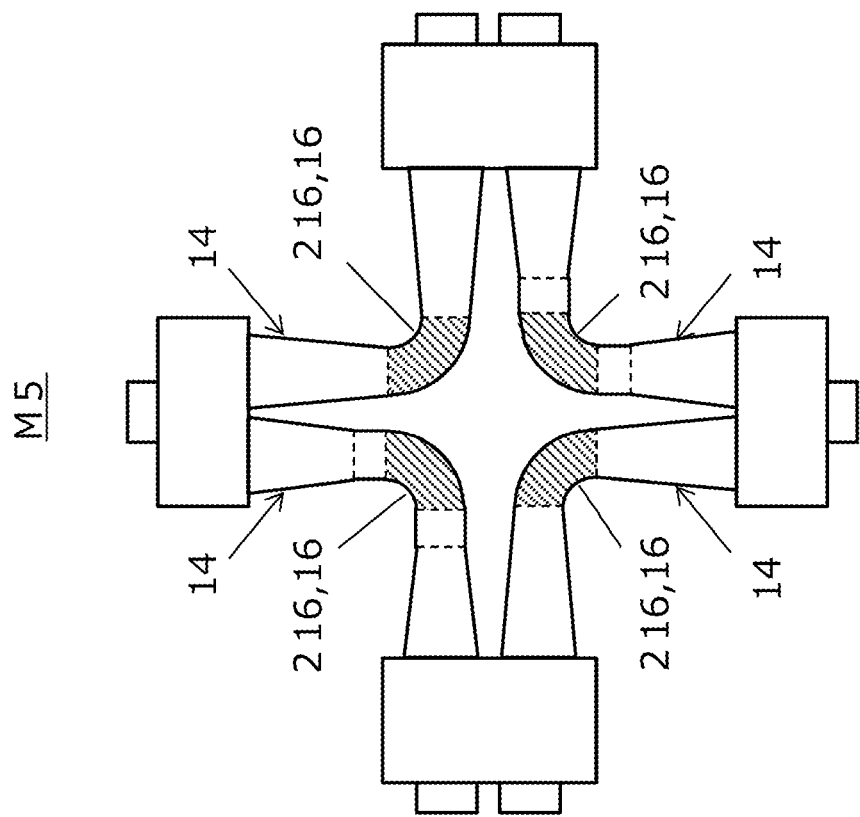
FIG. 20 is a plan view illustrating a 90-degree optical hybrid M5 according to a fifth modification.

FIG. 20 is a plan view illustrating a 90-degree optical hybrid M5 according to a fifth modification. In the examples illustrated in FIGS. 2 to 4, the phase-shift waveguide 222 is the linear waveguide 22. On the other hand, a phase-shift waveguide 216 according to the fifth modification is the bend waveguide 16.

According to the fifth modification, since variations of a phase-shift waveguide increase, the degree of freedom in design of a 90-degree optical hybrid increases. Furthermore, according to the fifth modification, since the bend waveguide 16 doubles as a phase-shift waveguide, the arm waveguide 14 is able to be shortened.

(3-6) Sixth Modification

Phase differences $\phi1$ to $\phi4$ that are given by the arm waveguides 14 to beams of splitted light of the optical splitters 10 are able to be represented by expressions (3) and (4).

$$\phi i = \phi_0 i + \Delta\phi i \quad (3)$$

$$\phi_0 2 - \phi_0 1 + \phi_0 4 - \phi_0 3 = 0 \quad (4)$$

In the expressions, i denotes an integer that is 1 or more and 4 or less.

$\Delta\phi1$ is a phase that is given to the first split light 304a (refer to FIG. 15) by the phase-shift waveguide of the first arm waveguide 14a. $\Delta\phi2$ is a phase that is given to the second split light 304b by the phase-shift waveguide of the second arm waveguide 14b. $\Delta\phi3$ is a phase that is given to the third split light 304c by the phase-shift waveguide of the third arm waveguide 14c. $\Delta\phi4$ is a phase that is given to the fourth split light 304d by the phase-shift waveguide of the fourth arm waveguide 14d.

In the examples illustrated in FIGS. 3 and 4, $\phi_0 1=\phi_0 3$, $\phi_0 2=\phi_0 4$, and $\phi_0 2=\phi_0 1$. However, $\phi_0 1$ to $\phi_0 4$ may not satisfy these conditions. For instance, $\phi_0 1$ to $\phi_0 4$ may satisfy the three conditions of $\phi_0 1=\phi_0 2$, $\phi_0 3=\phi_0 4$, and $\phi_0 1\ne\phi_0 3$. Alternatively, for instance, $\phi_0 1$ to $\phi_0 4$ may satisfy the three conditions of $\phi_0 1=\phi_0 4$, $\phi_0 2=\phi_0 3$, and $\phi_0 1\ne\phi_0 3$. Expression (4) is satisfied even when these conditions are satisfied.

Figure 21:
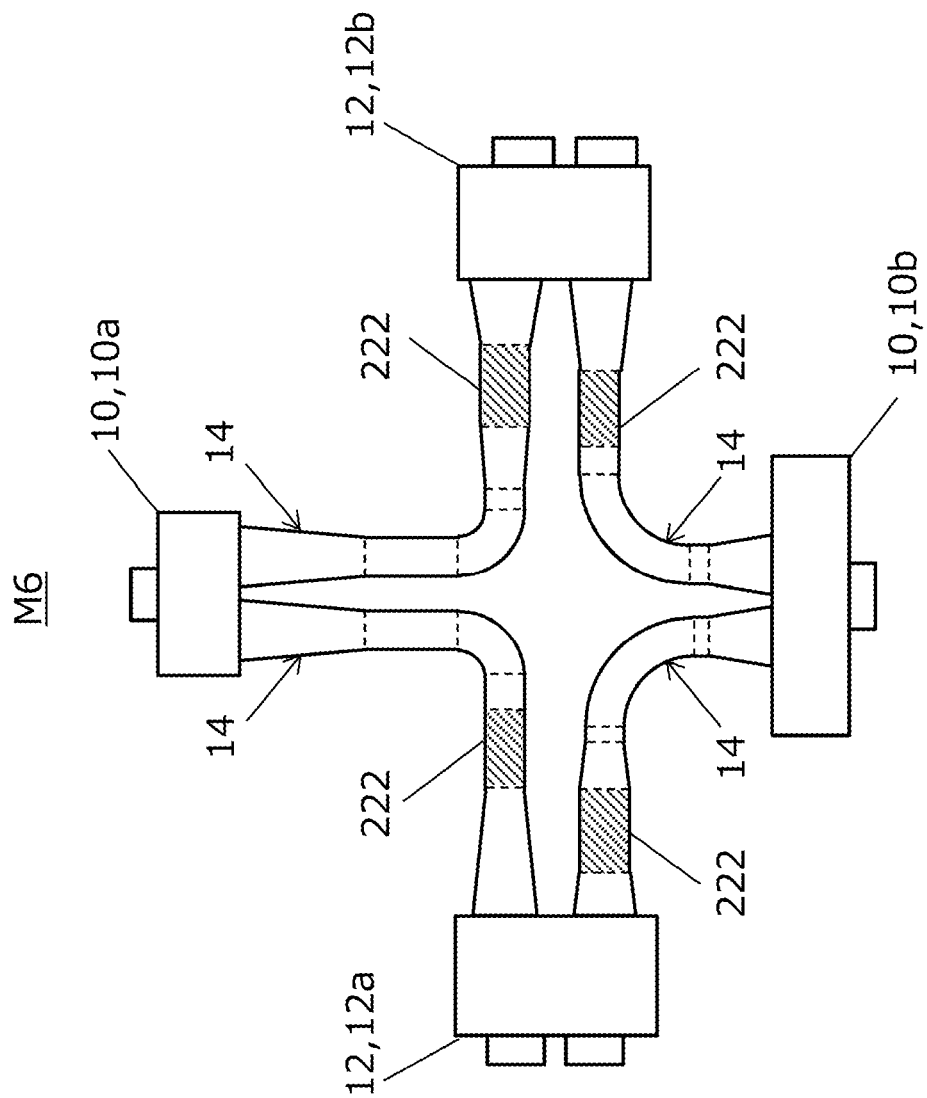
FIG. 21 is a plan view illustrating an example of a 90-degree optical hybrid M6 according to a sixth modification.

FIG. 21 is a plan view illustrating an example of a 90-degree optical hybrid M6 according to a sixth modification. FIG. 21 illustrates an example of the 90-degree optical hybrid M6 that satisfies the three conditions of $\phi_0 1=\phi_0 2$, $\phi_0 3=\phi_0 4$, and $\phi_0 1\ne\phi_0 3$. As illustrated in FIG. 21, according to the sixth modification, structures (e.g., a width or an interval of the output ports $P_{out}$) of the two optical splitters 10a and 10b are able to be significantly differentiated from each other. On the other hand, in the case of $\phi_o1=\phi_o4$, $\phi_o2=\phi_o3$, and $\phi_o1\neq\phi_o3$, structures of the two optical combiners 12a and 12b are able to be significantly differentiated from each other.

Therefore, according to the sixth modification, a range of selection for the optical splitters 10 and the optical combiners 12 is able to be widened.

(3-7) Seventh Modification

Positions at which the respective arm waveguides 14 are arranged are not limited to the positions illustrated in FIG. 15. For instance, the first arm waveguide 14a and the second arm waveguide 14b may be transposed and, further, the third arm waveguide 14c and the fourth arm waveguide 14d may be transposed. Due to the transpositions, since positions at which the beams of interfering light Qp and Qn are outputted and positions at which the beams of interfering light Ip and In are outputted are transposed, a degree of freedom of an arrangement method of peripheral circuits (a balanced photodetector and the like) of the 90-degree optical hybrid increases.

In the examples described above, θ is approximately 90° and positive. However, θ may be approximately −90°. In this case, the optical combiner that outputs the beams of interfering light Ip and In and the optical combiner that outputs the beams of interfering light Qp and Qn are transposed. θ being approximately −90° is equivalent to the transposition described in the sixth modification (i.e. the transposition of arm waveguides 14). The same applies when 0 is approximately −90°+360°×m (where m is an integer other than 0).

According to the second embodiment, loss reduction of the 90-degree optical hybrid is able to be achieved in a same manner to the first embodiment. According to the second embodiment, further, a fluctuation in the phase differences between beams of interfering light due to wavelength dependency of the optical splitters 10 is able to be suppressed. This is because, in the second embodiment, the phase differences between beams of interfering light outputted from the optical combiners 12 are controlled by a phase difference θ (refer to expression (1)) given to the beams of split light 304a to 304d by the arm waveguides 14, not by the optical splitters 10.

As demonstrated by the first to seventh modifications, according to the second embodiment, variations of the arm waveguides 14 and the like increase. Therefore, according to the second modification, a degree of freedom in design of a 90-degree optical hybrid further increases.

Third Embodiment

A third embodiment is almost equivalent to the first and second embodiments. Therefore, descriptions of the same configurations and the like as in the first and second embodiments will be either omitted or simplified.

A structure of a 90-degree optical hybrid 308 (refer to FIGS. 2 to 4) according to the third embodiment is approximately the same as that of the 90-degree optical hybrid 208 (refer to FIG. 15) according to the second embodiment. The first arm waveguide 14a and the third arm waveguide 14c according to the third embodiment respectively have a first phase-shift waveguide 222a (refer to FIG. 3). The second arm waveguide 14b and the fourth arm waveguide 14d according to the third embodiment respectively have a second phase-shift waveguide 222b (refer to FIG. 4). The phase-shift waveguides 222a and 222b according to the third embodiment are the linear waveguides 22.

As is apparent from expressions (3) and (4) according to the second embodiment, phases Δφi given to light splitted from the optical splitters 10 by each phase-shift waveguide of each arm waveguide 14 satisfies expression (5).

$$\theta=(\Delta\phi2-\Delta\phi1)+(\Delta\phi4-\Delta\phi3) \quad (5)$$

As is apparent from expressions (4) and (5), a phase-shift waveguide is an optical waveguide that gives a value other than 0 to the phase difference θ.

Respective lengths and respective widths of the first and second phase-shift waveguides 222a and 222b according to the third embodiment are set so that an absolute value of an average change rate of the phase difference θ with respect to a wavelength λ is equal to or lower than an allowable value within a specific range of the wavelength λ. Hereinafter, this condition will be referred to as a "wavelength non-dependency condition of the phase difference θ".

In this case, the "specific range of the wavelength λ" refers to a wavelength range including a specific wavelength $\lambda_o$ (e.g., 1547.5 nm) that is set so that φ1 to φ4 satisfy expression (2). The "specific range of the wavelength λ" is for instance, the C band (1530 nm to 1565 nm). The wavelength $\lambda_o$ is a wavelength (common wavelength) of the first light 302a and the second light 302b.

The "specific range of the wavelength λ" is not limited to the C band. For instance, the "specific range of the wavelength λ" may be the O band, the E band, the S band, the L band, the U band, or the like. Alternatively, the "specific range of the wavelength λ" may represent a narrower range than these wavelength bands. For instance, the "specific range of the wavelength λ" may be a range of 1540 nm or more and 1555 nm or less which is narrower than the C band. Alternatively, the "specific range of the wavelength λ" may be a range of 1480 nm or more and 1510 nm or less which is narrower than the S band. Alternatively, the "specific range of the wavelength λ" may be a range of 1585 nm or more and 1605 nm or less which is narrower than the L band.

The "an average change rate of the phase difference θ with respect to a wavelength λ" refers to an average rate of change of the phase difference θ (refer to expression (1)) with respect to the wavelength λ. The wavelength λ is a wavelength (common wavelength) of the first split light 304a to the fourth split light 304d.

The average change rate of the phase difference θ refers to $\{\theta(\lambda max)-\theta(\lambda min)/(\lambda max-\lambda min)\}$. $\theta(\lambda)$ is a function indicating a value of the phase difference θ at the wavelength λ. λmax represents a maximum value of the wavelength λ in the "specific range of the wavelength λ" (e.g., the upper limit 1565 nm of the C band). λmin represents a minimum value of the wavelength in the "specific range of the wavelength λ" (e.g., the lower limit 1530 nm of the C band).

An allowable value of the average change rate is preferably 0 degrees/nm or more and 0.14 degrees/nm or less, more preferably 0 degrees/nm or more and 0.1 degrees/nm or less, and most preferably 0 degrees/nm or more and 0.01 degrees/nm or less.

When the allowable value is 0 degrees/nm or more and 0.14 degrees/nm or less, a change amount of the phase difference θ in the C band is ±5° or less. In this case, in the C band an optical signal-to-noise ratio of the beams of interfering light Ip, In, Qp, and Qn that are outputted from the 90-degree optical hybrid 308 is suppressed to 0.5 dB or lower.

The "wavelength non-dependency condition of the phase difference θ" is realized by, for instance, a phase-shift waveguide of which a length and a width have been adjusted so that θ=90° and dθ/dλ=0 are satisfied at a central wavelength λc of the "specific range of the wavelength λ".

When a length of the first phase-shift waveguide 222a is denoted by L1 and a length of the second phase-shift waveguide 222b is denoted by L2, the phase difference θ and dθ/dλ are represented by expressions (6) and (7).

$$\theta = (\phi 2 - \phi 1) + (\phi 4 - \phi 3) = (4n/\lambda) \times (N2 \times L2 - N1 \times L1) = \qquad (6)$$
$$(4n/\lambda) \times L2 \times \{N2 - N1 \times (L1/L2)\}$$

$$d\theta/d\lambda = (1/\lambda) \times [4n \times L2 \times \{(dN2/d\lambda) - (dN1/d\lambda) \times (L1/L2)\} - \theta] \qquad (7)$$

N1 denotes an effective refractive index of the first phase-shift waveguide. N2 denotes an effective refractive index of the second phase-shift waveguide. An effective refractive index refers to a refractive index of a TE0 mode that is calculated by, for instance, the finite element method. N1 is a function of a width W1 of the first phase-shift waveguide 222a and the wavelength λ. N2 is a function of a width W2 of the second phase-shift waveguide 222b and the wavelength λ.

By substituting π/2 into θ and, further, substituting 0 rad/nm into dθ/dλ in expressions (6) and (7), expressions (8) and (9) are obtained.

$$\pi/2 = (4\pi/\lambda) \times L2 \times \{N2 - N1 \times (L1/L2)\} \qquad (8)$$

$$0 = 4\pi \times L2 \times \{(dN2/d\lambda) - (dN1/d\lambda) \times (L1/L2)\} - \pi/2 \qquad (9)$$

The "wavelength non-dependency condition of the phase difference θ" is realized by, for instance, L1, L2, W1, and W2 which satisfy expressions (8) and (9) at the central wavelength λc of the "specific range of the wavelength λ". Since expressions (8) and (9) are two equations for the four variables L1, L2, W1, and W2, the variables L1, L2, W1, and W2 satisfying expressions (8) and (9) are readily specified. On the other hand, when there is only one phase-shift waveguide, since variables are limited to L1 and W1, the variables L1 and W1 that satisfy expressions (8) and (9) do not always exist.

An efficient way to specify L1, L2, W1, and W2 which satisfy expressions (8) and (9) is to adjust L1/L2 while adjusting a value of L2 so that expressions (8) and (9) are satisfied.

Figure 22:
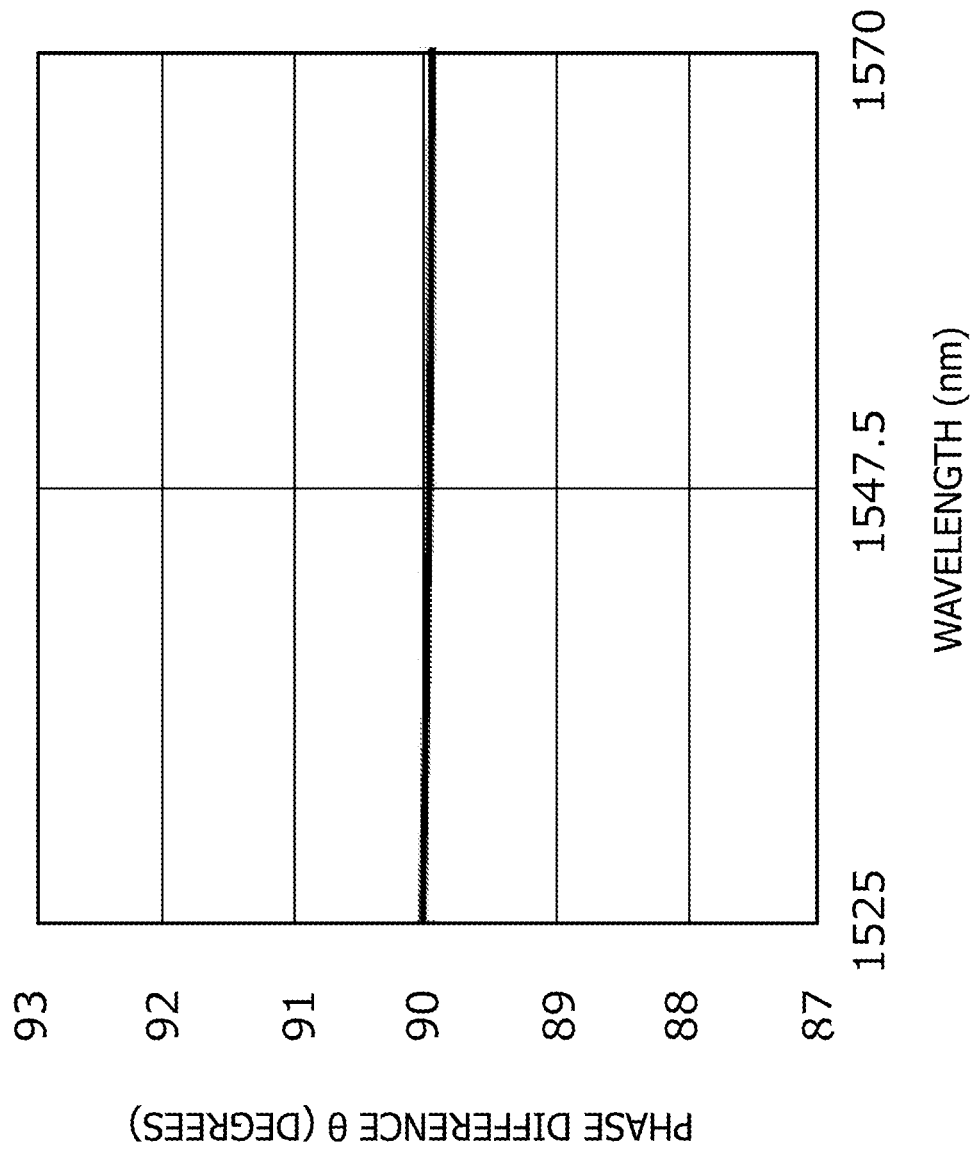
FIG. 22 is a diagram illustrating an example of a relationship between the phase difference θ and the wavelength λ.

FIG. 22 is a diagram illustrating an example of a relationship between the phase difference θ and the wavelength λ. The relationship illustrated in FIG. 22 is a relationship between the phase difference θ and the wavelength λ in a case where L1, L2, W1, and W2 are set so that expressions (8) and (9) are satisfied at a central wavelength 1547.5 nm. An abscissa represents the wavelength λ. An ordinate represents the phase difference θ.

Parameters used for a simulation of the phase difference θ are as follows. The width W1 and the length L1 of the first phase-shift waveguide 222a are 0.9 μm and 1.571 μm. The width W2 and the length L2 of the second phase-shift waveguide 222b are 1.278 μm and 1.605 μm. The core of the arm waveguides 14 and the like is Si. The clad of the arm waveguides 14 and the like is SiO₂.

Since the width W2 of the second phase-shift waveguide 222b (refer to FIG. 4) is wider than the width W1 of the first phase-shift waveguide 222a (refer to FIG. 3), the second phase-shift waveguide 222b is arranged so as to be sandwiched between tapered waveguides 18 (refer to FIG. 4). On the other hand, the first phase-shift waveguide 222a is arranged so as to be sandwiched between the linear waveguide 22 and the tapered waveguide 18.

As illustrated in FIG. 22, a variation range of the phase difference θ in the specific wavelength range [1525 nm to 1570 nm] is 0.1 nm or less. In other words, the average change rate of the phase difference θ in the wavelength range [1525 nm to 1570 nm] including the C band is 0.002 degrees/nm and is within a favorable range (0 degrees/nm or more and 0.14 degrees/nm or less) of the allowable value.

In the example described above, the phase-shift waveguide is provided in each arm waveguide. However, the phase-shift waveguide may be provided only in the first and second arm waveguides and may not be provided in the third and fourth arm waveguides.

According to the third embodiment, since a phase-shift waveguide is provided in a plurality of arm waveguides, the phase difference θ is able to be made wavelength non-dependent in a specific wavelength range.

Fourth Embodiment

A fourth embodiment is almost equivalent to the second and third embodiments. Therefore, descriptions of the same configurations and the like as in the second and third embodiments will be either omitted or simplified.

A structure of a 90-degree optical hybrid according to the fourth embodiment is approximately the same as that of the 90-degree optical hybrid according to the third embodiment. However, respective lengths and respective widths of the first and second phase-shift waveguides 222a and 222b are set so that an absolute value of the average change rate of the phase difference θ with respect to an error ΔW of a waveguide width from a target value is equal to or lower than an allowable value within a specific range of the error ΔW. Hereinafter, this condition will be referred to as an "error non-dependency condition of the phase difference θ".

The "error ΔW of a waveguide width from a target value" refers to an error ΔW of a width of each of the first and second phase-shift waveguides from respective target value (e.g., respective design value). The "error ΔW" is a computational error and, when it is assumed that an error ΔW1 of the width of the first phase-shift waveguide 222a and an error ΔW2 of the width of the second phase-shift waveguide 222b coincide with each other, the "error ΔW" is the error ΔW1 (or ΔW2). In other words, ΔW=ΔW1=ΔW2.

Therefore, the "average change rate of the phase difference θ with respect to the error ΔW" refers to an average change rate of the phase difference θ with respect to the error ΔW in the case that it is assumed that the error of the width of the first phase-shift waveguide from a target value and the error of the width of the second phase-shift waveguide from a target value coincide with each other. For instance, the error ΔW corresponds to manufacturing error. As is well known, manufacturing error is not dependent on waveguide width and is approximately constant.

The "average change rate of the phase difference θ" refers to $\{\theta(\Delta W_{max}) - \theta(\Delta W_{min})/(\Delta W_{max} - \Delta W_{min})\}$. θ(ΔW) is a function of the phase difference θ with respect to the error W. $\Delta W_{max}$ represents a maximum value of the error ΔW within the "specific range of the error ΔW". $\Delta W_{min}$ represents a minimum value of the error ΔW within the "specific range of the error ΔW".

The "specific range of the error ΔW" (hereinafter, referred to as an error range) is, for instance, a range defined by an inequality −25 nm≤ΔW≤25 nm. In this case, $\Delta W_{min}$ is −25 nm. $\Delta W_{max}$ is 25 nm. The "specific range of the error ΔW" is not limited to the range described above. For instance, the "specific range of the error ΔW" may be a range defined by an inequality −10 nm≤ΔW≤10 nm. Alternatively, the "specific range of the error ΔW" may be a range defined by an inequality −50 nm≤ΔW≤50 nm.

An allowable value of an error range is preferably 0 degrees/nm or more and 0.2 degrees/nm or less, more preferably 0 degrees/nm or more and 0.01 degrees/nm or less, and most preferably 0 degrees/nm or more and 0.005 degrees/nm or less. When the allowable value is 0 degrees/nm or more and 0.2 degrees/nm or less, a change amount of the phase difference θ in the error range described above (−25 nm≤ΔW≤25 nm) is ±5° or less and an optical signal-to-noise ratio of the beams of interfering light Ip, In, Qp, and Qn is suppressed to 0.5 dB or lower.

For instance, the "error non-dependency condition of the phase difference θ" is realized by a phase-shift waveguide of which a length and a width are adjusted so that θ=90° and dθ(ΔW)/dΔW=0 are satisfied at the specific wavelength λ when the error ΔW is 0 nm.

When the length of the first phase-shift waveguide 222a is denoted by L1 and the length of the second phase-shift waveguide 222b is denoted by L2, the phase difference θ and dθ(ΔW)/dΔW are represented by expressions (10) and (11).

$$\theta = (\phi2 - \phi1) + (\phi4 - \phi3) = (4n/\lambda) \times (N2 \times L2 - N1 \times L1) = \quad (10)$$
$$(4n/\lambda) \times L2 \times \{N2 - N1 \times (L1/L2)\}$$

$$d\theta(\Delta W)/d\Delta W = \quad (11)$$
$$(4n/\lambda) \times L2 \times \{dN2/d\Delta W - (dN1/d\Delta W) \times (L1/L2)\}$$

N1 denotes an effective refractive index of the first phase-shift waveguide. N2 denotes an effective refractive index of the second phase-shift waveguide. N1 is a function of the width W1 of the first phase-shift waveguide 222a and the wavelength λ. N2 is a function of a width W2 of the second phase-shift waveguide 222b and the wavelength λ. θ(ΔW) is a function indicating the phase difference θ in a case where W1 satisfying expression (10) for a specific θ (e.g. 90°) changes to W1+ΔW and, furthermore, W2 satisfying expression (10) for the specific θ (e.g. 90°) changes to W2+ΔW. In this case, the target value of the waveguide width of the first phase-shift waveguide 22a is W1 that satisfies expression (10) for the specific θ (e.g. 90°). The target value of the waveguide width of the second phase-shift waveguide 222b is W2 that satisfies expression (10) for the specific θ (e.g. 90°).

π/2 (in other words, 90°) is substituted into θ in expression (10) and, further, 0 rad/nm is substituted into dθ(ΔW)/dΔW in expression (11). As a result, expressions (12) and (13) are obtained.

$$\pi/2 = (4\pi/\lambda) \times L2 \times \{N2 - N1 \times (L1/L2)\} \quad (12)$$

$$0 = dN2/d\Delta W - dN1/d\Delta W \times (L1/L2) \quad (13)$$

Therefore, the "error non-dependency condition of the phase difference θ" is realized by L1, L2, W1, and W2 which satisfy expressions (12) and (13).

Expressions (12) and (13) are two equations for the four variables L1, L2, W1, and W2. Therefore, the variables L1, L2, W1, and W2 satisfying expressions (12) and (13) are readily specified. On the other hand, when there is only one phase-shift waveguide, since variables are limited to L1 and W1, the variables L1 and W1 that satisfy expressions (12) and (13) do not always exist.

An efficient way to specify L1, L2, W1, and W2 which satisfy expressions (12) and (13) is to adjust L1/L2 while adjusting a value of L2 so that expressions (12) and (13) are satisfied.

Figure 23:
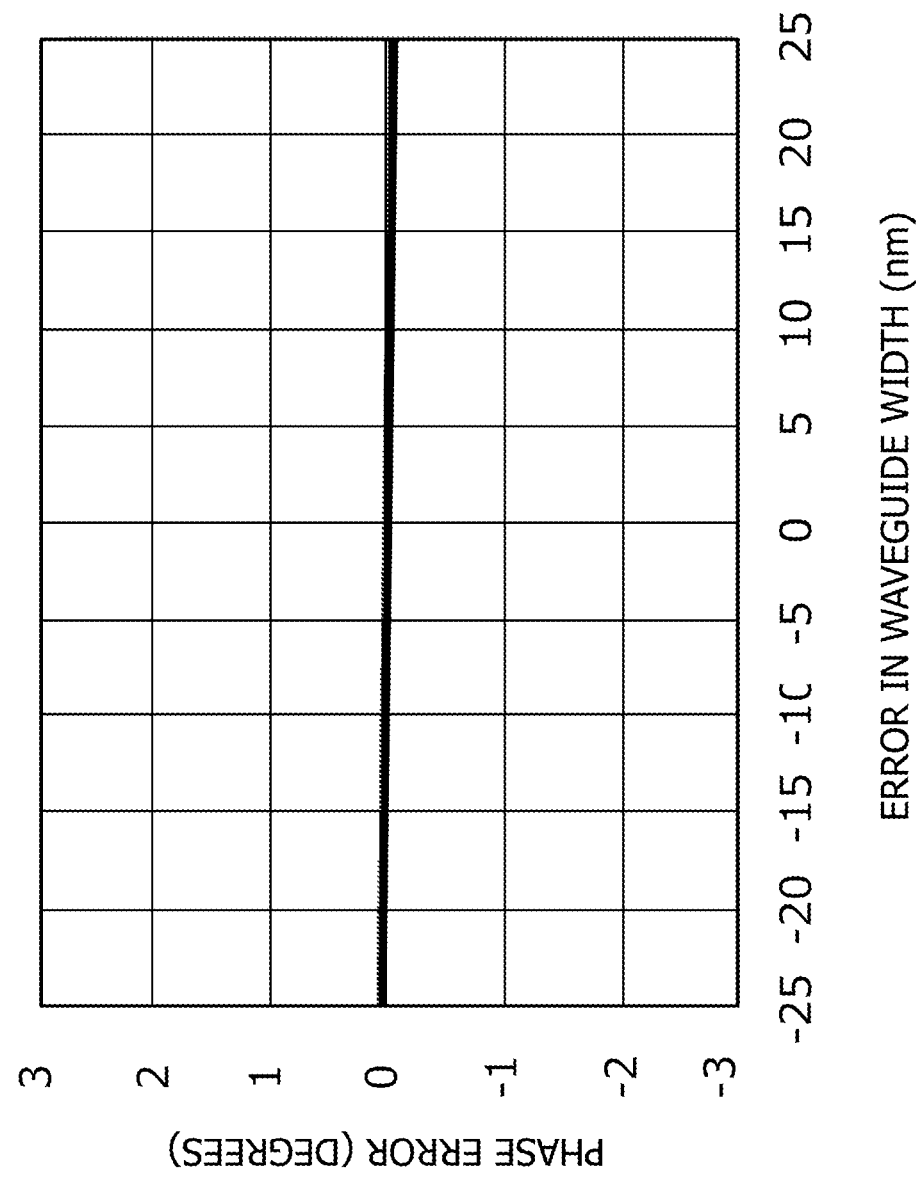
FIG. 23 is a diagram illustrating an example of a relationship between a phase error and an error of a waveguide width.

FIG. 23 is a diagram illustrating an example of a relationship between a phase error and an error of a waveguide width. An abscissa represents an error of the waveguide width (in other words, an error ΔW). An ordinate represents a phase error. A wavelength of each beam of splitted light is 1547.5 nm. A phase error on the ordinate represents a difference between the phase difference θ and 90°.

Parameters used for the simulation of the phase difference θ are as follows. The width W1 and the length L1 of the first phase-shift waveguide 222a are 1.065 μm and 0.620 μm. The width W2 and the length L2 of the second phase-shift waveguide 222b are 1.118 μm and 0.688 μm. The core of the arm waveguides 14 and the like is Si. The clad of the arm waveguides 14 and the like is SiO$_2$.

As illustrated in FIG. 23, a variation range of the phase difference θ in the specific error range [−25 nm to +25 nm] is 0.1 nm or less. Therefore, the average change rate of the phase difference θ in the specific error range [−25 nm to +25 nm] is 0.002 degrees/nm and is within a favorable range (0 degrees/nm or more and 0.2 degrees/nm or less) of the allowable value.

Figure 24:
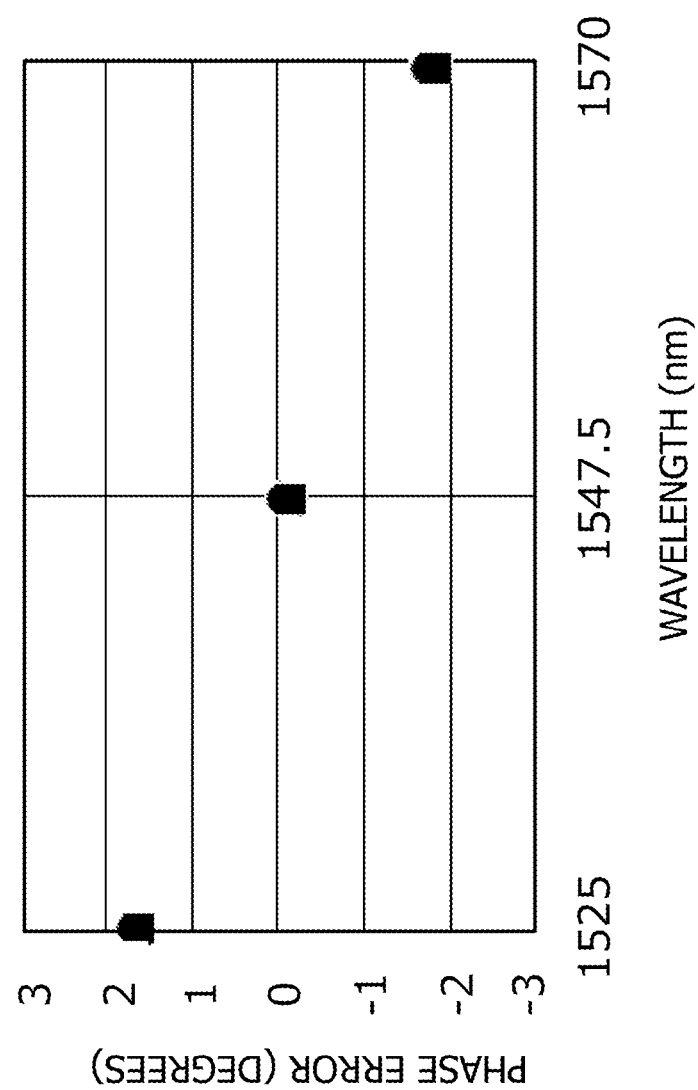
FIG. 24 is a diagram illustrating an example of a relationship between phase error and the wavelength λ when the error non-dependency condition of the phase difference θ is satisfied.

FIG. 24 is a diagram illustrating an example of a relationship between phase error and the wavelength λ when the error non-dependency condition of the phase difference θ is satisfied. An abscissa represents a wavelength of each beam of splitted light. An ordinate represents a phase error. A plot depicted by a black circle represents a phase error when the error ΔW is −25 nm. A plot depicted by a black triangle represents a phase error when the error ΔW is 0 nm. A plot depicted by a black square represents a phase error when the error ΔW is 25 nm. The width and the length of each phase-shift waveguide are the same as the width and the length used in the calculation illustrated in FIG. 23.

As illustrated in FIG. 24, the respective plots approximately overlap with each other in a wide range [1525 nm to 1570 nm] including the C band. In other words, FIG. 24 indicates that, according to the fourth embodiment, a fluctuation in phase error due to manufacturing error is able to be suppressed over a wide range including the C band.

According to the fourth embodiment, since phase-shift waveguides are provided in a plurality of arm waveguides, a fluctuation in the phase difference θ due to an error of the waveguide width (e.g., a manufacturing error) is able to be suppressed.

Fifth Embodiment

A fifth embodiment is almost equivalent to the first to fourth embodiments (in particular, to the first embodiment). Therefore, descriptions of the same configurations and the like as in the first to fourth embodiments will be either omitted or simplified.

Figure 25:
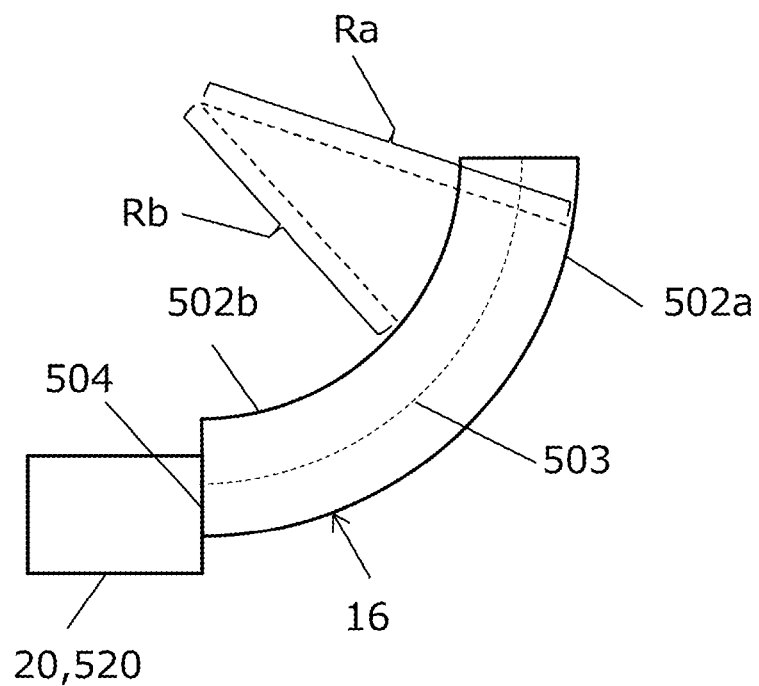
FIG. 25 is a diagram illustrating a vicinity of a boundary between one of the plurality of optical waveguides 20 and the bend waveguide 16.

FIG. 25 is a diagram illustrating a vicinity of a boundary between one of the plurality of optical waveguides 20 (hereinafter, referred to as an optical waveguide 520) and the bend waveguide 16. As illustrated in FIGS. 2 to 4 and the like, each waveguide included in the arm waveguide 14 is connected to another optical waveguide 20 or the bend waveguide 16 included in the arm waveguide 14 so that their end surfaces cover with each other without excess or deficiency and their side surfaces are continuous. On the other hand, the bend waveguide 16 according to the fifth embodiment is off-set connected to the optical waveguide 520 as illustrated in FIG. 25.

A first side surface 502a of the bend waveguide 16 is an outer circumferential-side side surface and a second side surface 502b is an inner circumferential-side side surface.

Therefore, a curvature radius Ra of the first side surface 502a (refer to FIG. 25) of the bend waveguide 16 is greater than a curvature radius Rb of the second side surface 502b of the bend waveguide 16.

In the fifth embodiment, the first side surface 502a of the bend waveguide 16 is in contact with an end surface 504 (hereinafter, referred to as a second end surface) of the optical waveguide 520. On the other hand, the second side surface 502b of the bend waveguide 16 is separated from the end surface 504 of the optical waveguide 520.

As described with reference to FIG. 10, an electric field distribution of light that propagates along the bend waveguide 16 is eccentrically located on a side of the first side surface 502a with a great curvature radius. Therefore, when the side surfaces of the optical waveguide 520 and the side surfaces of the bend waveguide 16 are continuous (refer to FIG. 10), a mismatch of electric field distributions occurs at an interfacial boundary between the optical waveguide 520 and the bend waveguide 16. As a result, loss is generated.

The electric field distribution of the optical waveguide 520 is eccentrically located at a center of the optical waveguide 520. According to the fifth embodiment, a mismatch between the electric field distribution of the optical waveguide 520 and the electric field distribution of the bend waveguide 16 is suppressed, the electric field distribution of the bend waveguide 16 being eccentrically located on the side of the first side surface 502a (e.g., refer to Masaki Kohtoku, "Waveguide Manufacturing Technology Supporting Next Generation PLC", NTT Technical Review, May 2005, pages 28-31). Therefore, according to the fifth embodiment, loss due to a mismatch between electric field distributions of the bend waveguide 16 and the optical waveguide 520 is able to be suppressed.

FIG. 25 illustrates only the optical waveguide 520 connected to one end surface of the bend waveguide 16. The other optical waveguide that is connected to the other end surface of the bend waveguide 16 may also be offset-connected to the bend waveguide 16 in a same manner to the optical waveguide 520.

When the bend waveguide 16 is a single-mode waveguide, a mismatch of electric field distributions is unlikely to occur since the electric field distribution is eccentrically located in a vicinity of a central axis 503 of the bend waveguide. However, when the bend waveguide 16 is a single-mode waveguide, the arm waveguide 14 becomes elongated since the width of the arm waveguide 14 narrows down to a narrow waveguide width of the single-mode waveguide. As a result, loss of the arm waveguide 14 increases.

According to the fifth embodiment, since a mismatch of electric field distributions on an interfacial boundary between the bend waveguide 16 and the optical waveguide 520 is suppressed, loss reduction of a 90-degree optical hybrid is able to be realized.

Sixth Embodiment

A sixth embodiment is almost equivalent to the first to fourth embodiments (in particular, to the first embodiment). Therefore, descriptions of the same configurations and the like as in the first to fourth embodiments will be either omitted or simplified.

Figure 26:
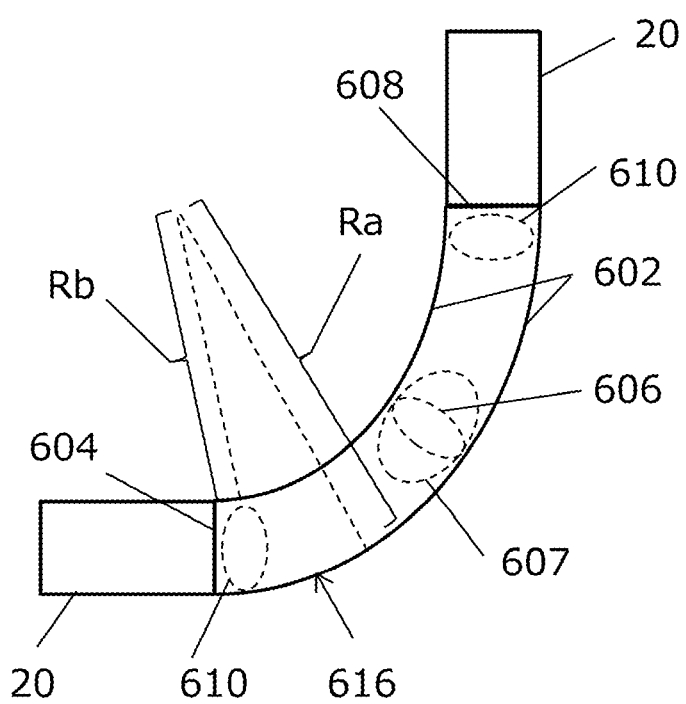
FIG. 26 is a diagram illustrating a bend waveguide 616 according to the sixth embodiment.

FIG. 26 is a diagram illustrating a bend waveguide 616 according to the sixth embodiment. As illustrated in FIG. 26, curvature radii Ra and Rb of respective side surfaces 602 of the bend waveguide 616 according to the sixth embodiment continuously decrease from one end 604 of the bend waveguide 616 toward a central part 606 of the bend waveguide 616 and, further, continuously decrease from another end 608 of the bend waveguide 616 toward the central part 606. Each side surface 602 of the bend waveguide 616 in a plan view is, for instance, a clothoid curve (e.g., refer to Masaki Kohtoku, "Waveguide Manufacturing Technology Supporting Next Generation PLC", NTT Technical Review, May 2005, pages 28-31).

In the example illustrated in FIG. 26, the curvature radii Ra and Rb of respective side surfaces 602 are held at constant values in an intermediate part 607 (a region including the central part 606). However, each side surface 602 of the bend waveguide 616 may continuously decrease from the one end 604 of the bend waveguide 616 toward the central part 606 of the bend waveguide 616 and continuously increase from the central part 606 toward the other end 608 of the bend waveguide 616. In other words, a region where the curvature radii are held at constant values may not be provided. The curvature radii Ra and Rb at both ends of the bend waveguide 616 are favorably infinite.

When the curvature radii of the respective side surfaces 602 are increased in a connection region 610 in contact with the optical waveguide 20, the electric field distribution in the connection region 610 is eccentrically located in a vicinity of a central axis. As a result, a mismatch between the electric field distribution of the optical waveguide 20 and the electric field distribution of the bend waveguide 616 is suppressed. Therefore, according to the sixth embodiment, a loss at an interfacial boundary between the bend waveguide 616 and the optical waveguide 20 is able to be suppressed. Furthermore, by gradually reducing the curvature radius of each side surface 602 as a distance from the one end 604 of the bend waveguide 616 increases, a great bend angle (e.g., 90°) is able to be realized with a small bend waveguide.

While embodiments of the present invention have been described above, it is to be understood that the first to sixth embodiments are illustrative and not restrictive. For instance, in the first to sixth embodiments, the core of the arm waveguide 14 is silicon. However, the core of the arm waveguide 14 may be InP or GaAs.

In the first to sixth embodiments, the clad of the arm waveguide 14 is $SiO_2$. However, the clad of the arm waveguide 14 may be a clad with a two-layer structure in which a portion on which the core is mounted is $SiO_2$ and a portion covering a side surface and an upper surface of the core is SiN. Alternatively, the arm waveguide 14 may be an optical waveguide in which both a core and a clad are $SiO_2$ as with a planar lightwave circuit (PLC).

The arm waveguide 14 according to the first to sixth embodiments is an optical waveguide in which a core has a rectangular cross section (in other words, a rectangular waveguide). However, the arm waveguide 14 may be a rib waveguide in which a core has a rib part and thin slab parts provided on both sides of the rib part. In a rib waveguide, since propagating light seeps out to the slab parts, loss due to side wall roughness of the core is suppressed.

Alternatively, the arm waveguide 14 may be a high-mesa waveguide in which a core is provided inside a band-shaped protrusion of a clad layer. The arm waveguide 14 may be a ridge waveguide in which an upper clad having a band-shaped protrusion is provided on an upper surface of a slab-shaped core.

As described in the first to sixth embodiments, the arm waveguide 14 may be a rectangular waveguide. Since a rectangular waveguide offers strong light confinement, a low-loss bend waveguide with a slight curvature radius is able to be realized by a rectangular waveguide. Therefore, according to a rectangular waveguide, the 90-degree optical hybrids according to the first to sixth embodiments are able to be downsized.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A 90-degree optical hybrid comprising:
two optical splitters configured to respectively split inputted light into two beams;
two optical combiners configured to respectively combine two beams of inputted light and thereby output two beams of interfering light respectively; and
four arm waveguides that are optical waveguides separated from each other, each of the four arm waveguides being configured to input light splitted by any of the two optical splitters into any of the two optical combiners, wherein
each of the four arm waveguides has a bend waveguide arranged at center thereof and a plurality of optical waveguides including a tapered waveguide having a width that decreases toward the bend waveguide,
both ends of each of the plurality of optical waveguides are respectively in contact with a first end surface of any one of the two optical splitter, the two optical combiners, the bend waveguide and the plurality of optical waveguides, and
each of the plurality of optical waveguides is the tapered waveguide or a linear waveguide having a constant width.

2. The 90-degree optical hybrid according to claim 1, wherein
one of the two optical splitters is configured to split first light inputted therein into first split light and second split light,
the other of the two optical splitters is configured to split second light inputted therein into third split light and fourth split light,
the four arm waveguides include a first arm waveguide configured to input the first split light into a first optical combiner, which is one of the two optical combiners, a second arm waveguide configured to input the second split light into a second optical combiner, which is the other of the two optical combiners, a third arm waveguide configured to input the third split light into the second optical combiner, and a fourth arm waveguide configured to input the fourth split light into the first optical combiner, and
when $\phi1$ denotes a phase given to an electric field of the first split light by the first arm waveguide, $\phi2$ denotes a phase given to an electric field of the second split light by the second arm waveguide, $\phi3$ denotes a phase given to an electric field of the third split light by the third arm waveguide, $\phi4$ denotes a phase given to an electric field of the fourth split light by the fourth arm waveguide, $\Delta$ denotes an allowable error, and m denotes an integer equal to or greater than zero, then in a case where respective wavelengths of the first light and the second light are a specific first wavelength,
a phase difference $\theta$ satisfies $$\theta=(\phi2-\phi1)+(\phi4-\phi3), \text{ and}$$

$$90°-\Delta+360°\times m \leq |\theta| \leq 90°+\Delta+360°\times m.$$

3. The 90-degree optical hybrid according to claim 2, wherein the allowable error is 0° or more and 5° or less.

4. The 90-degree optical hybrid according to claim 2, wherein
the first arm waveguide has a first phase-shift waveguide that is the linear waveguide and that is configured to give a value other than zero to the phase difference $\theta$,
the second arm waveguide has a second phase-shift waveguide that is the linear waveguide and that is configured to give a value other than zero to the phase difference $\theta$, and
respective lengths and respective widths of the first phase-shift waveguide and the second phase-shift waveguide are set so that, when a wavelength of each of the first to fourth split light is a second wavelength, an absolute value of an average change rate of the phase difference $\theta$ with respect to the second wavelength is equal to or lower than an allowable value within a specific range of the second wavelength including the specific first wavelength.

5. The 90-degree optical hybrid according to claim 4, wherein the allowable value is 0 degrees/nm or more and 0.14 degrees/nm or less.

6. The 90-degree optical hybrid according to claim 2, wherein
the first arm waveguide has a first phase-shift waveguide that is the linear waveguide and that is configured to give a value other than zero to the phase difference $\theta$,
the second arm waveguide has a second phase-shift waveguide that is the linear waveguide and that is configured to give a value other than zero to the phase difference $\theta$, and
respective lengths and respective widths of the first phase-shift waveguide and the second phase-shift waveguide are set so that, when a first error of a width of the first phase-shift waveguide from a target value is a second error of a width of the second phase-shift waveguide from a target value, an absolute value of an average change rate of the phase difference $\theta$ with respect to the first error is equal to or lower than an allowable value within a specific range of the first error.

7. The 90-degree optical hybrid according to claim 6, wherein the allowable value is 0 degrees/nm or more and 0.2 degrees/nm or less.

8. The 90-degree optical hybrid according to claim 1, wherein
a curvature radius of a first side surface of the bend waveguide is greater than a curvature radius of a second side surface of the bend waveguide,
the first side surface is in contact with a second end surface of any one of the plurality of optical waveguides, and
the second side surface is separated from the second end surface.

9. The 90-degree optical hybrid according to claim 1, wherein
curvature radiuses of each side surface of the bend waveguide continuously decrease from one end thereof toward a central part thereof and, further, continuously decrease from another end thereof toward the central part.

* * * * *